United States Patent
Lee et al.

(10) Patent No.: US 11,363,485 B2
(45) Date of Patent: Jun. 14, 2022

(54) ELECTRONIC DEVICE TRANSMITTING AND RECEIVING PACKETS AND METHOD OF OPERATING THE SAME

(71) Applicant: SAMSUNG ELECTRONICS CO., LTD., Suwon-si (KR)

(72) Inventors: Keonyoung Lee, Suwon-si (KR); Yushin Kim, Suwon-si (KR); Dongjin Lee, Suwon-si (KR); Bumjin Jung, Suwon-si (KR); Gwanghyun Gho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/065,116

(22) Filed: Oct. 7, 2020

(65) Prior Publication Data

US 2021/0337417 A1  Oct. 28, 2021

(30) Foreign Application Priority Data

Apr. 28, 2020 (KR) .................. 10-2020-0051288

(51) Int. Cl.
*H04W 28/02* (2009.01)
*H04L 41/0654* (2022.01)
(Continued)

(52) U.S. Cl.
CPC ..... *H04W 28/0231* (2013.01); *H04L 41/0654* (2013.01); *H04W 28/10* (2013.01); *H04W 74/0833* (2013.01)

(58) Field of Classification Search
CPC ............ H04W 28/0231; H04W 28/10; H04W 28/0289; H04W 74/0833; H04W 24/10;
(Continued)

(56) References Cited

U.S. PATENT DOCUMENTS

2015/0146617 A1* 5/2015 Park ................. H04W 28/06
370/328
2018/0070325 A1* 3/2018 Yi .......................... H04L 1/18
(Continued)

FOREIGN PATENT DOCUMENTS

KR   10-2019-0085447   7/2019
WO   2014/183672       11/2014
(Continued)

OTHER PUBLICATIONS

Search Report and Written Opinion dated Jan. 26, 2021 in counterpart International Patent Application No. PCT/KR2020/013775.
(Continued)

*Primary Examiner* — Ricardo H Castaneyra
(74) *Attorney, Agent, or Firm* — Nixon & Vanderhye P.C.

(57) ABSTRACT

According to an embodiment, an electronic device comprises: at least one processor, wherein the at least one processor may be configured to: receive a first message indicating a packet data convergence protocol (PDCP) state of a network from the network, identify a first missing count (FMC) of the network based on the first message, identify a count of a message scheduled to be transmitted by the electronic device, compare the count of the message scheduled to be transmitted with the FMC, and adjust the count of the message scheduled to be transmitted based on a result of the comparison.

17 Claims, 25 Drawing Sheets

(51) Int. Cl.
*H04W 28/10* (2009.01)
*H04W 74/08* (2009.01)

(58) Field of Classification Search
CPC ......... H04W 72/0413; H04W 72/0406; H04W 76/27; H04W 76/19; H04W 56/001; H04W 36/305; H04W 28/02; H04L 41/0654; H04L 47/34; H04L 27/2602
See application file for complete search history.

(56) References Cited

U.S. PATENT DOCUMENTS

| | | | |
|---|---|---|---|
| 2018/0124642 A1* | 5/2018 | Phuyal | H04W 24/10 |
| 2018/0241509 A1* | 8/2018 | Phuyal | H04W 28/085 |
| 2019/0199503 A1 | 6/2019 | Son | |
| 2019/0349810 A1 | 11/2019 | Cho et al. | |
| 2019/0394675 A1 | 12/2019 | Baek et al. | |
| 2021/0021504 A1* | 1/2021 | Balasu | H04L 43/0835 |

FOREIGN PATENT DOCUMENTS

| | | |
|---|---|---|
| WO | 2019/212249 | 11/2019 |
| WO | 2019/246350 | 12/2019 |

OTHER PUBLICATIONS

Ericsson, "Early Data Forwarding," R3-197444, 3GPP TSG-RAN W63 Meeting #106, Reno, NV, USA, Nov. 8, 2019, 14 pages.
International Search Report and Written Opinion dated Aug. 27, 2021 in corresponding European Application No. 21160285.9.
"3rd Generation Partnership Project; Technical Specification Group Radio Access Network; 5GS; User Equipment (UE) conformance specification; Part 1: Protocol (Release 15)", 3GPP Standard; Technical Specification; 3GPP TS 38.523-1, 3rd Generation Partnership Project (3GPP), Mobile Competence Centre , 650, Route Des Lucioles , F-06921 Sophia-Antipolis Cedex, France, vol. RAN WG5, No. VI5.0.0, Jun. 25, 2018 (Jun. 25, 2018), pp. 1-621, XP051474175.

* cited by examiner

ELECTRONIC DEVICE TRANSMITTING AND RECEIVING PACKETS AND METHOD OF OPERATING THE SAME

CROSS-REFERENCE TO RELATED APPLICATION

This application is based on and claims priority under 35 U.S.C. § 119 to Korean Patent Application No. 10-2020-0051288, filed on Apr. 28, 2020, in the Korean Intellectual Property Office, the disclosure of which is incorporated by reference herein in its entirety.

BACKGROUND

Field

The disclosure relates to electronic devices transmitting/receiving packets and methods for operating the same.

Description of Related Art

As mobile communication technology evolves, multi-functional portable terminals are commonplace and, to meet increasing demand for radio traffic, vigorous efforts are underway to develop 5G communication systems. To achieve a higher data transmission rate, a higher frequency band (e.g., a band exceeding 6 GHz) in addition to the frequency band (such as of 6 GHz or less) which is adopted for 3G and LTE is considered for 5G communication systems to enable quicker data transmission.

User equipment (UE) may transmit/receive packets to/from a network. Packets may be transmitted/received between the UE and the network based on packet data convergence protocol (PDCP) protocol data units (PDUs). For the uplink (UL) and data link (DL), a hyper frame number (HFN) is set in the PDCP PDU. A count (COUNT) is set based on the sequence number (SN) included in the header of the PDCP PDU and the HFN. The UE and/or network may perform operations for in-order delivery of the PDCP PDU using the count. The UE and/or network may perform integrity verification and/or ciphering/deciphering using the count.

When the UE and network communicate with each other, a significant difference may be made between the SN of the transmitting PDCP PDU and the SN of the PDCP PDU expected by the receiving side.

For the UL, the SN of the PDCP PDU transmitted from the UE may be less than the SN expected to be received by the network. In this case, the SN of the PDCP PDU transmitted from the UE may gradually increase and, until it becomes identical to the SN expected to be received by the network, all the PDCP PDUs may be discarded as out of window. For example, when the SN of the PDCP PDU transmitted from the UE is 100, and the SN expected by the network is 500, the PDCP PDUs whose SNs range from 100 to 499 all are discarded by the network. For the DL, the SN of the PDCP PDU transmitted from the network may be less than the SN expected to be received by the UE. In this case, the PDCP PDUs transmitted from the network are all discarded by the UE.

The above information is presented as background information to assist with an understanding of the disclosure. No determination has been made, and no assertion is made, as to whether any of the above might be applicable as prior art with regard to the disclosure.

SUMMARY

Embodiments of the disclosure provide an electronic device and method of operating the same that may identify a mismatch between the respective counts of a transmission entity and a reception entity and perform operations to address the mismatch.

In accordance with various example embodiments, an electronic device comprises: at least one processor, wherein the at least one processor may be configured to: receive a first message indicating a packet data convergence protocol (PDCP) state of a network from the network, identify a first missing count (FMC) of the network based on the first message, identify a count of a message scheduled to be transmitted by the electronic device, compare the count of the message scheduled to be transmitted with the FMC, and adjust the count of the message scheduled to be transmitted based on a result of the comparison.

In accordance with various example embodiments, an electronic device comprises: at least one processor, wherein the at least one processor may be configured to: receive a first message from a network, compare a count of the first message with at least one count set in the electronic device, and adjust the at least one count set in the electronic device based on a result of the comparison.

In accordance with various example embodiments, an electronic device comprises: at least one processor, wherein the at least one processor may be configured to: receive a first packet data convergence protocol (PDCP) control protocol data unit (PDU) for a PDCP status report indicating a PDCP status of a network from the network, identify a first missing count (FMC) included in the PDCP control PDU, identify a count of a message scheduled to be transmitted by the electronic device, and transmit a second PDCP control PDU including PDU type information indicating a PDCP recovery request based on the count of the message scheduled to be transmitted and the FMC meeting a designated condition.

Other aspects, advantages, and salient features of the disclosure will become apparent to those skilled in the art from the following detailed description, which, taken in conjunction with the annexed drawings, discloses various non-limiting example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1:
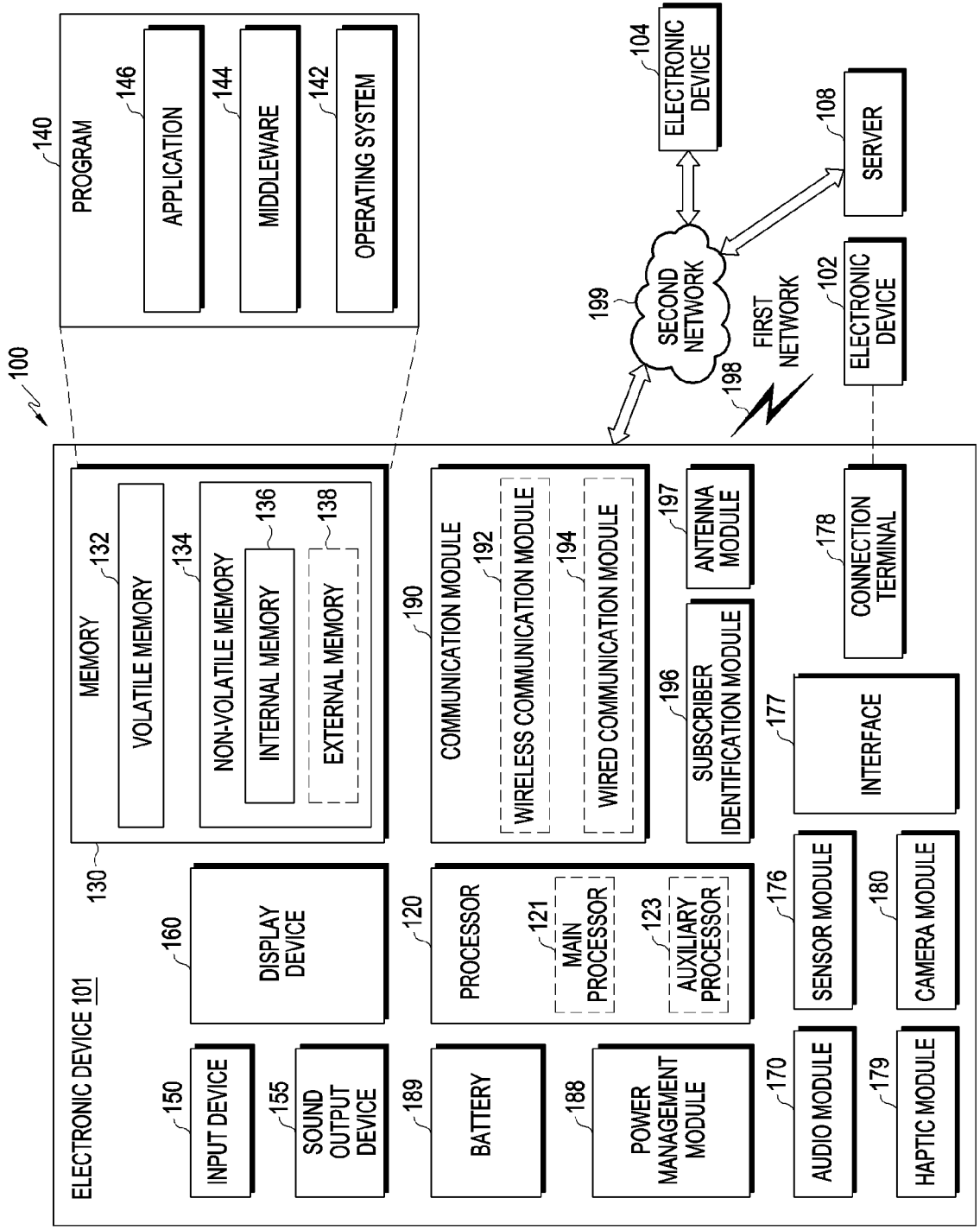
FIG. 1 is a diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include one or more antennas. In this case, at least one antenna appropriate for a communication scheme used in a communication network, such as the first network 198 or the second network 199, may be selected from the one or more antenna by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
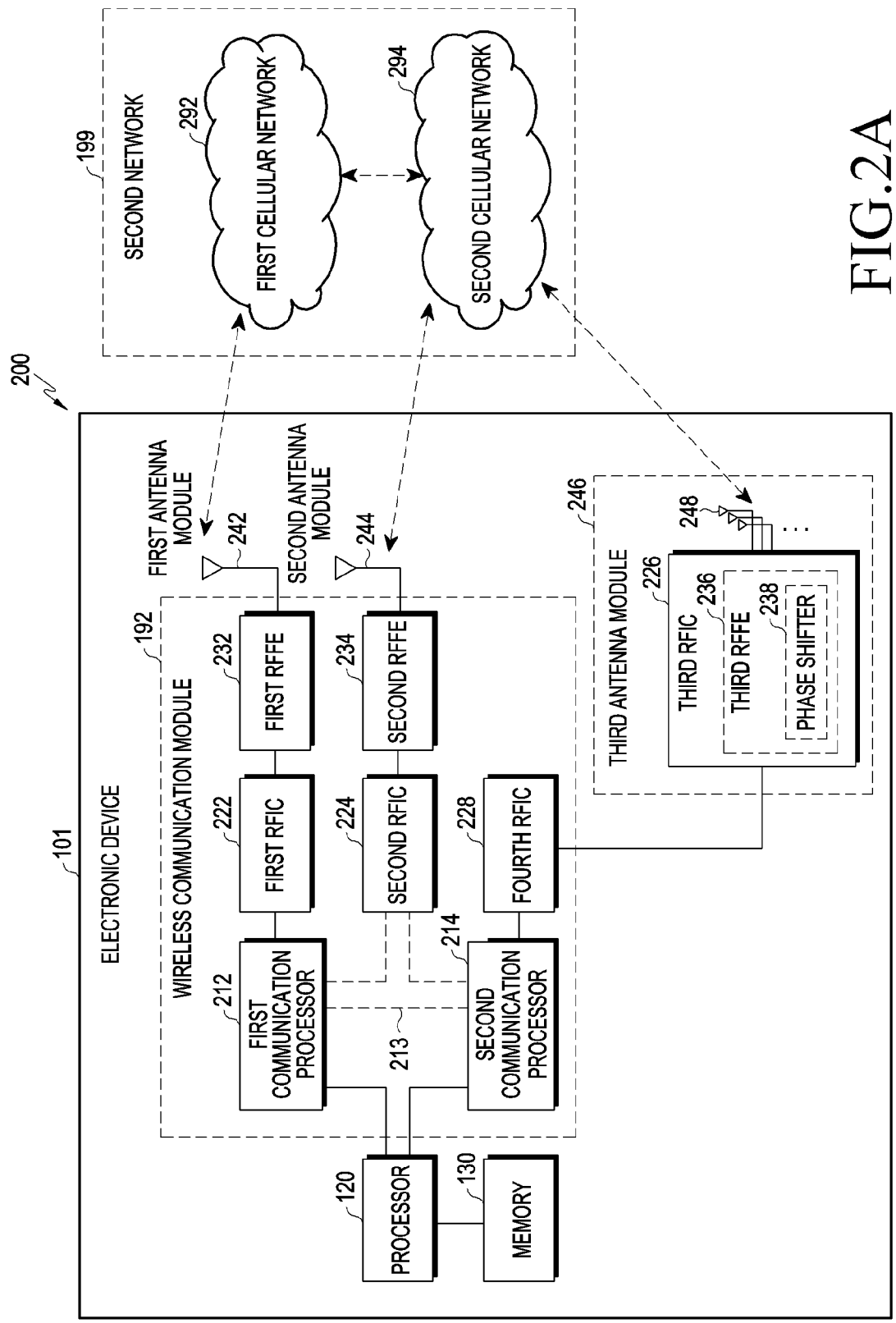
FIGS. 2A and 2B are block diagrams illustrating an electronic device supporting network communication and 5G network communication according to an embodiment.

FIG. 2A is a block diagram 200 illustrating an example electronic device 101 for supporting network communication and 5G network communication according to an embodiment. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The network 199 may include a first network 292 and a second network 294. According to an embodiment, the electronic device 101 may further include at least one component among the components of FIG. 1, and the network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may include various processing circuitry and establish a communication channel of a band that is to be used for wireless communication with the first network 292 or may support legacy network communication via the established communication channel. According to an embodiment, the first network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second network 294 or may support fifth generation (5G) network communication via the established communication channel. According to an embodiment, the second network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214.

For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
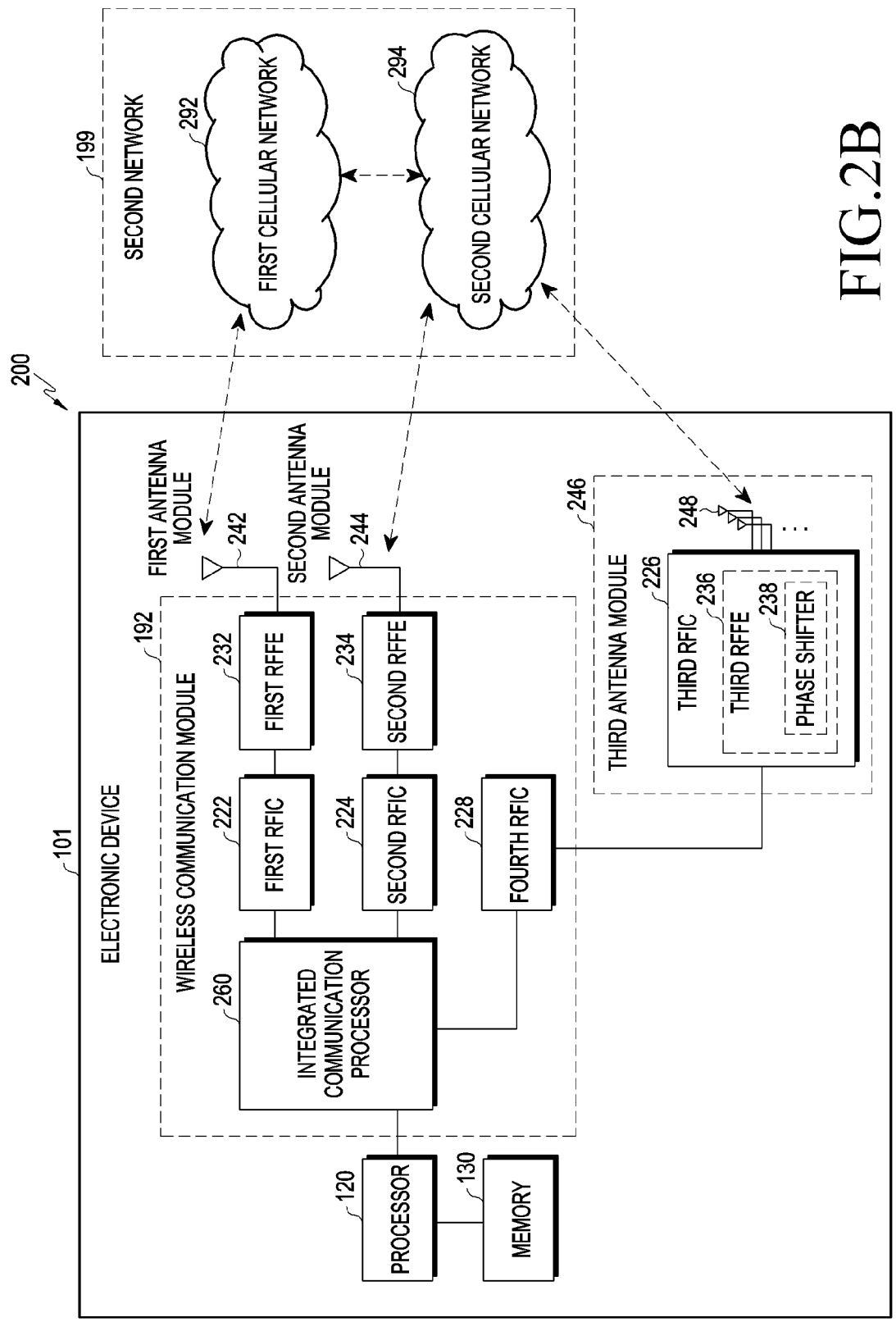

According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, an integrated communication processor (e.g., including processing circuitry) 260 may support all of the functions for communication with the first cellular network and the second cellular network.

Upon transmission, the first RFIC 222 may convert a baseband signal generated by the first CP 212 into a radio frequency (RF) signal with a frequency ranging from about 700 MHz to about 3 GHz which is used by the first network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second network 294 (e.g., a 5G network). Upon receipt, the 5G Sub6 RF signal may be obtained from the second network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second network 294 (e.g., a 5G network). Upon receipt, the 5G Above6 RF signal may be obtained from the second network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second network 294 (e.g., a 5G network) may be operated independently (e.g., as standalone (SA)) from, or in connection (e.g., as non-standalone (NSA)) with the first network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Although FIGS. 2A and 2B illustrate an example in which the processor 120 is separated from the first communication processor 212, the second communication processor 214, or the integrated communication processor 260, this is merely an example. According to an embodiment, the electronic device 101 may include an integrated system on chip (SoC) that supports all of the function of the processor 120, the function for the first network communication of the first communication processor 212, and the function for the second network communication of the second communication processor 214. It will be easily appreciated by one of ordinary skill in the art that the operations of the processor 120, the first communication processor 212, or the second communication processor 214 as described herein may be performed by the integrated SoC.

Although not shown, embodiments of the disclosure may also be applied to the electronic device 101 supporting LTE communication alone. In this case, the electronic device 101 may be implemented to include the processor 120 and/or the first communication processor 212, the first RFIC 222, the first RFFE 232, and the first antenna module 242, but not to include the components (e.g., at least one of the second RFIC 224, the second RFFE 234, the second antenna module 244, the second communication processor 214, the fourth RFIC 238, and the third antenna module 246) associated with 5G communication.

Figure 3:
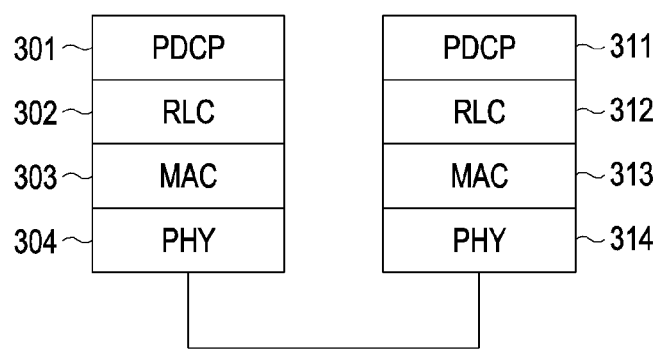
FIG. 3 is a diagram illustrating an example protocol structure according to an embodiment.

FIG. 3 is a diagram illustrating an example protocol structure according to an embodiment.

According to an embodiment, a protocol structure corresponding to an electronic device 101 (e.g., a UE) may include a PDCP layer 301, a radio link control (RLC) layer 302, a media access control (MAC) layer 303, and a physical (PHY) layer 304. A protocol structure corresponding to a network (e.g., a base station) may include a PDCP layer 311, an RLC layer 312, an MAC layer 313, and a PHY layer 314.

The PDCP layer 301 or 311 may be in charge of IP header compression/reconstruction. Example functions of the PDCP layer 301 or 311 may be summarized by way of example as follows:

header compression and decompression (ROHC only)
transfer of user data
in-sequence delivery of upper layer PDUs at PDCP re-establishment procedure for RLC AM
for split bearers in DC (only support for RLC AM), PDCP PDU routing for transmission and PDCP PDU reordering for reception
duplicate detection of lower layer SDUs at PDCP re-establishment procedure for RLC AM
retransmission of PDCP SDUs at handover and, for split bearers in DC, of PDCP PDUs at PDCP data-recovery procedure, for RLC AM
ciphering and deciphering
timer-based SDU discard in uplink The RLC layer 302 or 312 may reconstruct the PDCP packet data unit (PDU) into a proper size and perform operations, such as the ARQ function. Example functions of the RLC layer 302 or 312 may be summarized by way of example as follows:
transfer of upper layer PDUs
error correction through ARQ (only for AM data transfer)
concatenation, segmentation and reassembly of RLC SDUs (only for UM and AM data transfer)
re-segmentation of RLC data PDUs (only for AM data transfer)
reordering of RLC data PDUs (only for UM and AM data transfer)
duplicate detection (only for UM and AM data transfer)
protocol error detection (only for AM data transfer)
RLC SDU discard (only for UM and AM data transfer)
RLC re-establishment The MAC layer 303 or 313 may be connected with several RLC layer devices configured in one UE and may multiplex the RLC PDUs into the MAC PDU and demultiplex the MAC PDU into RLC PDUs. Example functions of the MAC layer 303 or 313 may be summarized by way of example as follows:
mapping between logical channels and transport channels
multiplexing/demultiplexing of MAC SDUs belonging to one or different logical channels into/from transport blocks (TB) delivered to/from the physical layer on transport channels
scheduling information reporting
error correction through HARQ
priority handling between logical channels of one UE
priority handling between UEs by means of dynamic scheduling
MBMS service identification
transport format selection
padding The physical (PHY) layer 304 or 314 may channel-code and modulate higher layer data into OFDM symbols, transmit the OFDM symbols through a wireless channel or demodulate OFDM symbols received through a wireless channel, channel-decodes and transfers the same to a higher layer.

Figure 4:
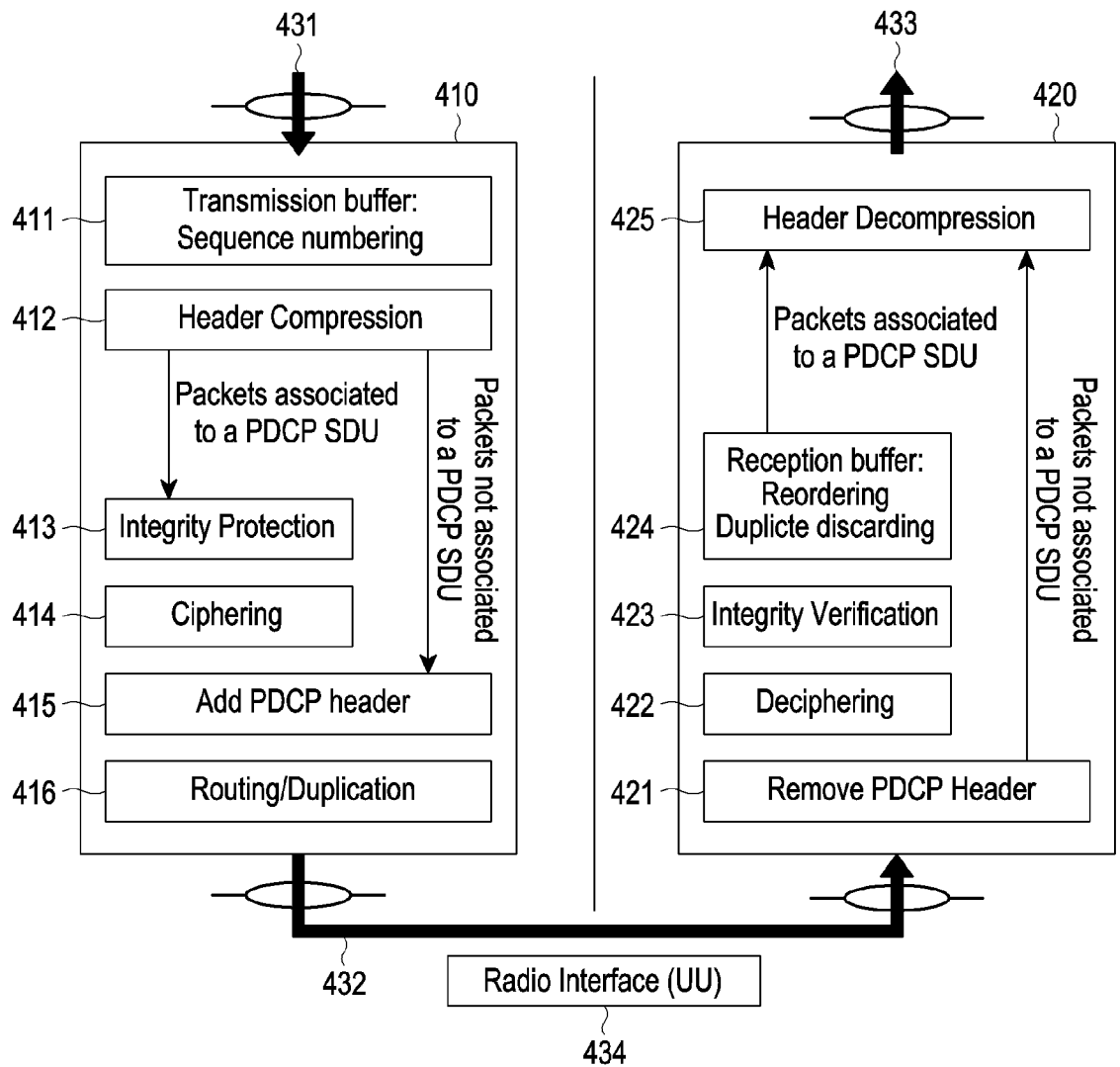
FIG. 4 is a diagram illustrating example operations of a PDCP layer according to an embodiment.

FIG. 4 is a diagram illustrating example operations of a PDCP layer according to an embodiment.

According to an embodiment, a transmitting PDCP entity 410 may receive an SDU 431 and output a PDU 432. The receiving PDCP entity 420 may receive the PDU 432 and output the SDU 433. The PDCP entities 410 and 420 may be located on the PDCP layer. Although FIG. 4 illustrates an example in which the PDU 432 is directly transmitted from the transmitting PDCP entity 410 to the receiving PDCP entity 420 via a radio interface (UU) 434, this is for ease of description, and it will be easily appreciated by one of ordinary skill in the art that the PDU 432 is transmitted through the RLC layer, MAC layer, and PHY layer.

According to an embodiment, the transmitting PDCP entity 410 may perform sequence numbering on the SDU 431 in a transmission buffer in operation 411. For example, the transmitting PDCP entity 410 may assign an SN to the SDU 431. The transmitting PDCP entity 410 may perform header compression on the SDU 431 in operation 412. If the packets to be transmitted are associated with the PDCP SDU, the transmitting PDCP entity 410 may perform an integrity protection procedure in operation 413. In operation 414, the transmitting PDCP entity 410 may perform ciphering on the data block generated as a result of the integrity protection procedure. In operation 415, the transmitting PDCP entity 410 may add a PDCP header. When the packets are not associated with a PDCP SDU, the transmitting PDCP entity 410 may add a PDCP header immediately without performing the integrity protection and ciphering operations. In operation 416, the transmitting PDCP entity 410 may perform routing/duplication on the PDU 432.

According to an embodiment, the receiving PDCP entity 420 may remove the PDCP header 421 from the received PDU 432 in operation 421. The receiving PDCP entity 420 may perform deciphering in operation 422 and integrity verification in operation 423. In operation 424, the receiving PDCP entity 420 may perform at least one of reordering, duplicating, or discarding on the integrity-verified data block in the reception buffer and transmit it to a higher layer. In operation 425, the receiving PDCP entity 420 may perform header decompression in operation 425. If the packets are not related to a PDCP SDU, the receiving PDCP entity 420 may remove the PDCP header and then perform header decompression. The receiving PDCP entity 420 may transmit the header-decompressed SDU 433 to a higher layer.

Figure 5A:
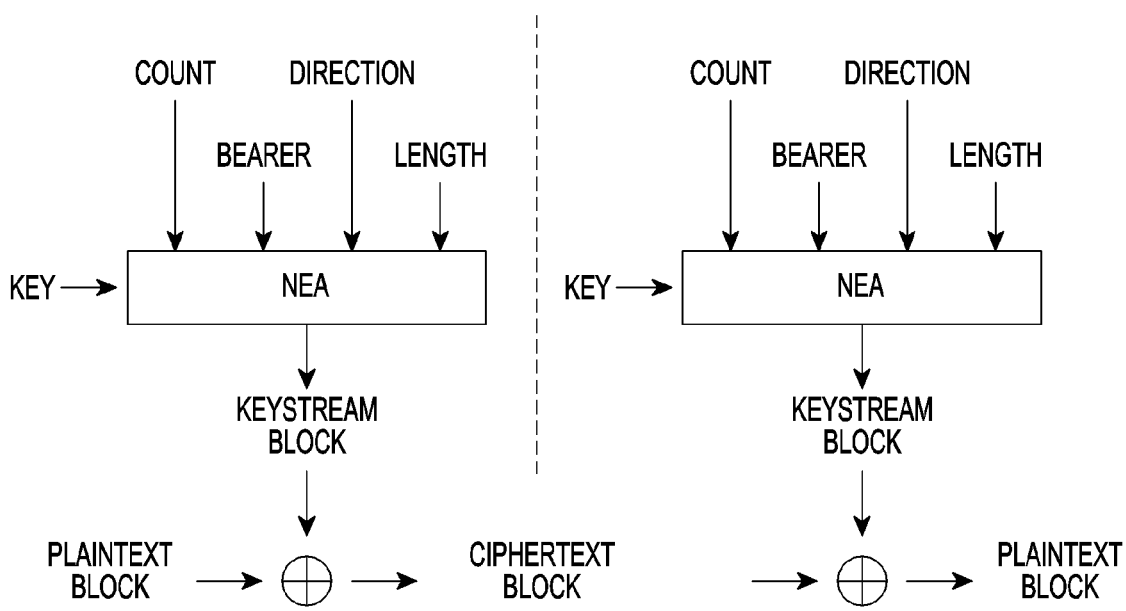
FIG. 5A is a diagram illustrating an example ciphering and deciphering process according to an embodiment.

FIG. 5A is a diagram illustrating an example ciphering and deciphering process according to an embodiment.

Figure 5B:
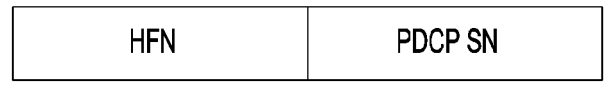
FIG. 5B is a diagram illustrating an example format of a count according to an embodiment.

According to an embodiment, the transmitting PDCP entity 410 may perform ciphering as in operation 414 of FIG. 4. Referring to FIG. 5A, the transmitting PDCP entity (e.g., the transmitting PDCP entity 410 of FIG. 4) may input a cipher key (KEY) (of, e.g., 128 bits), a count (COUNT) (of, e.g., 32 bits), a bearer identity (BEARER) (of, e.g., five bits), a transmission direction (DIRECTION) (of, e.g., one bit), and the length of a keystream required (LENGTH) to an NR encryption algorithm (NEA). The transmission direction (DIRECTION) may, for example, be 0 for the UL and 1 for the DL. The transmitting PDCP entity 410 may identify a keystream block (KEYSTREAM BLOCK) as an output from the NEA. Among the values input to the NEA, the count (COUNT) may be varied per packet. For example, FIG. 5B is a diagram illustrating a format of a count according to an embodiment. A count may include, e.g., a hyper frame number (HFN) and a PDCP sequence number (SN). The HFN may be retained by the transmitting PDCP entity and the receiving PDCP entity, and the SN may be included in the PDU. The counter may have a length of, e.g., 32 bits, and the length of the HFN may be 32 minus the PDCP SN length. The PDCP SN may be increased by one whenever one PDU is transmitted. Further, when the PDCP SN reaches its maximum value, the PDCP SN may turn back to its initial value, and the HFN may be increased by one. Thus, the count (COUNT) may be set to differ per packet, and the keystream blocks, which are the resultant values of NEA, may also be set to differ per packet. The transmitting PDCP entity 410 may provide a ciphertext block (CIPHERTEXT BLOCK) based on a plaintext block (PLAINTEXT BLOCK) and keystream block (KEYSTREAM BLOCK). For example, the transmitting PDCP entity 410 may provide the ciphertext block (CIPHERTEXT BLOCK) by performing computation (e.g., binary addition) on the plaintext block (PLAINTEXT BLOCK) and keystream block (KEYSTREAM BLOCK), but the kind of the computation is not limited thereto.

According to an embodiment, the receiving PDCP entity (e.g., the receiving PDCP entity 420 of FIG. 4) may perform deciphering as in operation 422 of FIG. 4. The receiving PDCP entity 420 may input a cipher key (KEY) (of, e.g., 128 bits), a count (COUNT) (of, e.g., 32 bits), a bearer identity (BEARER) (of, e.g., five bits), a transmission direction (DIRECTION) (of, e.g., one bit), and the length of a keystream required (LENGTH) to an NR encryption algorithm (NEA). The receiving PDCP entity 420 may identify a keystream block (KEYSTREAM BLOCK) as an output from the NEA. The receiving PDCP entity 420 may identify the plaintext block (PLAINTEXT BLOCK) based on computation on the keystream block (KEYSTREAM BLOCK) and the received ciphertext block (CIPHERTEXT BLOCK). The receiving PDCP entity 420 may be the inverse process of the computation by the transmitting PDCP entity 410, but not limited thereto. If the counts (COUNT) identified by the transmitting PDCP entity 410 and the receiving PDCP entity 420 differ from each other, the receiving PDCP entity 420 may fail in deciphering.

Figure 5C:
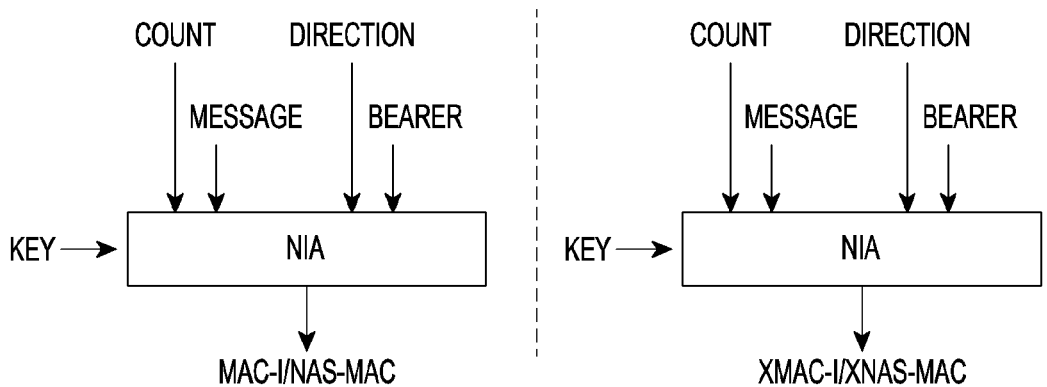
FIG. 5C is a diagram illustrating an example integrity verification process according to an embodiment.

FIG. 5C is a diagram illustrating an example integrity protection and verification process according to an embodiment.

According to an embodiment, the transmitting PDCP entity 410 may perform integrity protection as in operation 413 of FIG. 4. Referring to FIG. 5C, the transmitting PDCP entity 410 may input an integrity key (KEY) (of, e.g., 128 bits), a count (COUNT) (of, e.g., 32 bits), a bearer identity (BEARER) (of, e.g., five bits), a transmission direction (DIRECTION) (of, e.g., one bit), and a message (MESSAGE) to an NR encryption algorithm (NIA). The bit length of the message (MESSAGE) may be the LENGTH. The transmission direction (DIRECTION) may, for example, be 0 for the UL and 1 for the DL. The transmitting PDCP entity 410 may identify the MAC-I/NAS-MAC as an output value from the NIA. Among the values input to the NIA, the count (COUNT) may be varied per packet, and the MAC-I/NAS-MAC, as a result value of the NIA, may also be set to differ per packet. The MAC-I/NAS-MAC may be a 32-bit message identification code. The MAC-I/NAS-MAC may be added when the message is transmitted.

According to an embodiment, the receiving PDCP entity 420 may perform integrity verification as in operation 424 of FIG. 4. The receiving PDCP entity 420 may input an integrity key (KEY) (of, e.g., 128 bits), a count (COUNT) (of, e.g., 32 bits), a bearer identity (BEARER) (of, e.g., five bits), a transmission direction (DIRECTION) (of, e.g., one bit), and a message (MESSAGE) to the NIA. The receiving PDCP entity 420 may identify the XMAC-I/XNAS-MAC as an output value from the NIA. The XMAC-I/XNAS-MAC may be an expected message authentication code. If the MAC-I/NAS-MAC received from the transmitting PDCP entity 410 is identical to the calculated XMAC-I/XNAS-MAC, the receiving PDCP entity 420 may identify that integrity verification has succeeded and, if not, identify that the integrity verification has failed. If the counts (COUNT) identified by the transmitting PDCP entity 410 and the receiving PDCP entity 420 differ from each other, the receiving PDCP entity 420 may fail in integrity verification.

Figure 6A:
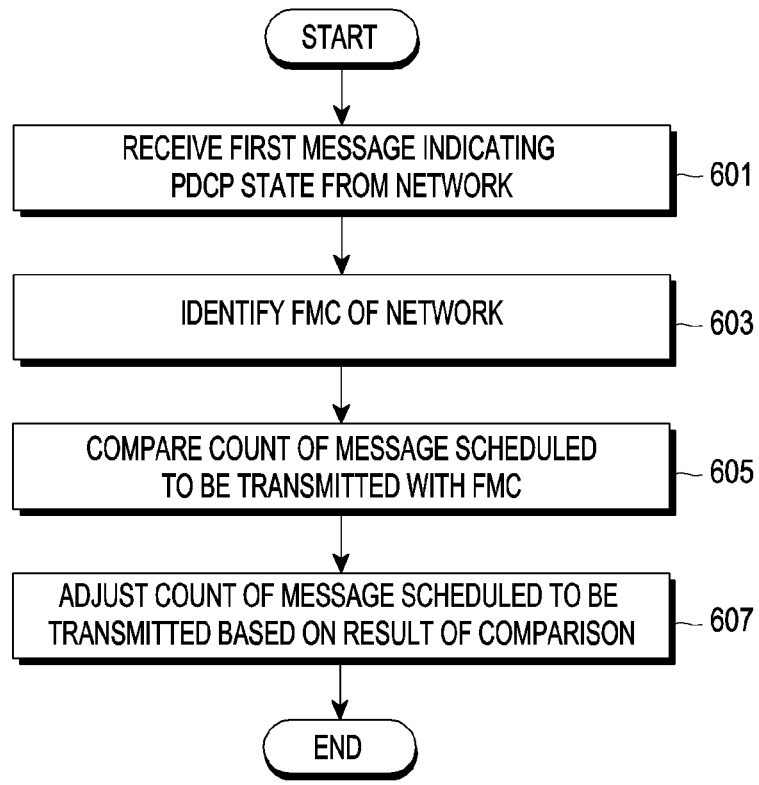
FIG. 6A is a flowchart illustrating an example method for operating an electronic device according to an embodiment.
Figure 6B:
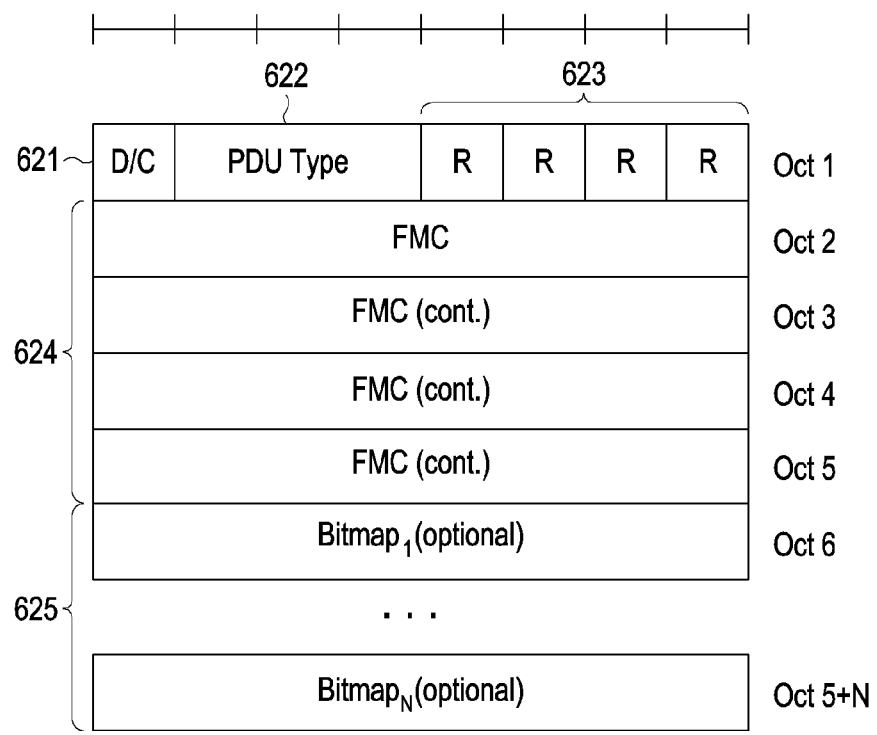
FIG. 6B is a diagram illustrating an example PDCP control PDU format for a PDCP status report according to an embodiment.

FIG. 6A is a flowchart illustrating an example method for operating an electronic device according to an embodiment. The embodiment of FIG. 6A is described with reference to FIG. 6B. FIG. 6B is a diagram illustrating an example PDCP control PDU format for a PDCP status report according to an embodiment.

According to an embodiment, an electronic device 101 (e.g., at least one of the processor 120, the first communication processor 212, the second communication processor 214, the integrated communication processor 260, or the integrated SoC) may receive a first message indicating the PDCP status from a network in operation 601. The electronic device 101 may receive a PDCP control PDU for PDCP status report from the network. For example, the electronic device 101 may receive the PDCP control PDU for PDCP status report upon handover, but the time of reception is not limited thereto. For example, the electronic device 101 may receive a PDCP control PDU with a format as shown in FIG. 6B. Referring to FIG. 6B, the PDCP control PDU may include one or more octets (eight bits). A first octet Oct1 may include a data/control (D/C) field 621, a PDU type field 622, and a reserved field 623. The value of the D/C field 621 may indicate whether the PDU is a data PDU or a control PDU. The value of the PDU type field 622 may indicate the PDU type. For example, 000 may indicate the PDCP status report type. A second octet Oct2 through a fifth octet Oct4, e.g., 40 bits, may include a first missing count (FMC) field 624. The value in the FMC field 624 may indicate the count of the PDU which the receiving PDCP entity has failed to receive in the reordering window for the first time. A sixth octet Oct6 through a 5+Nth octet (Oct5+N) may include a bitmap field 625. The length of the bitmap field 625 may be variable and may indicate whether the PDU corresponding to the subsequent count value is received from the FMC, but not limited thereto.

According to an embodiment, the electronic device 101 may identify the first missing count (FMC) of the network in operation 603. For example, the electronic device 101 may identify the first missing count based on the value of the FMC field 624 of the PDCP control PDU of FIG. 6B.

According to an embodiment, the electronic device 101 may compare the count of the message scheduled to be transmitted with the first missing count in operation 605. The electronic device 101, e.g., the transmitting PDCP entity, may, for example, retain the following state variables:

a) TX_NEXT: This state variable may indicate the count value of the next PDCP SDU to be transmitted, and its initial value may be set to 0.

For example, the electronic device 101 may compare the state variable of TX_NEXT with the first missing count. The electronic device 101 may adjust the count of the message scheduled to be transmitted based on the result of comparison in operation 607. For example, when the first missing count (e.g., the FMC) of the network is greater than the count (e.g., TX_NEXT) of the message scheduled to be transmitted, the electronic device 101 may be configured to adjust the count of the message scheduled to be transmitted. This may come from an error caused by at least one of the electronic device 101 or the network as the network expects a greater count than the count of the message scheduled to be transmitted. Or, for example, when the count (e.g., TX_NEXT) of the message scheduled to be transmitted is greater than the first missing count (e.g., the FMC) of the network, e.g., when the TX_NEXT is greater than the sum of the FMC and a designated value, the electronic device 101 may be configured to adjust the count of the message scheduled to be transmitted. Generally, the count of the message scheduled to be transmitted may be greater than the first missing count. However, when the count of the message scheduled to be transmitted is greater than the first missing count, e.g., a designated value or more, this may come from an error caused by at least one of the electronic device 101 or the network. An adjustment process for each of the above-described embodiments is described below.

Figure 7:
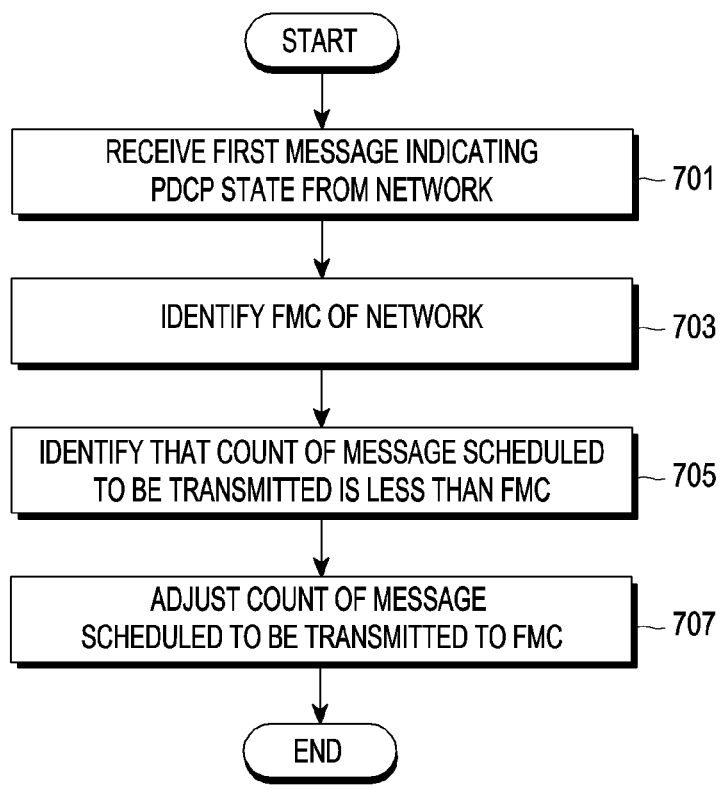
FIG. 7 is a flowchart illustrating an example method for operating an electronic device according to an embodiment.

FIG. 7 is a flowchart illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a first message indicating the PDCP status from a network in operation 701. For example, the electronic device 101 may receive a PDCP control PDU with a format as shown in FIG. 6B. In operation 703, the electronic device 101 may identify the first missing count (FMC) of the network. For example, the electronic device 101 may identify the first missing count based on the value of the FMC field 624 of the PDCP control PDU with a format as shown in FIG. 6B.

According to an embodiment, in operation 705, the electronic device 101 may identify that the count of the message scheduled to be transmitted is less than (or not more than) the first missing count. For example, the electronic device 101 may identify that the TX_NEXT under management is less than (or not more than) the received FMC. The electronic device 101 may adjust the count of the message scheduled to be transmitted to the first missing count in operation 707. For example, the electronic device 101 may adjust the TX_NEXT to the received FMC.

Figure 8A:
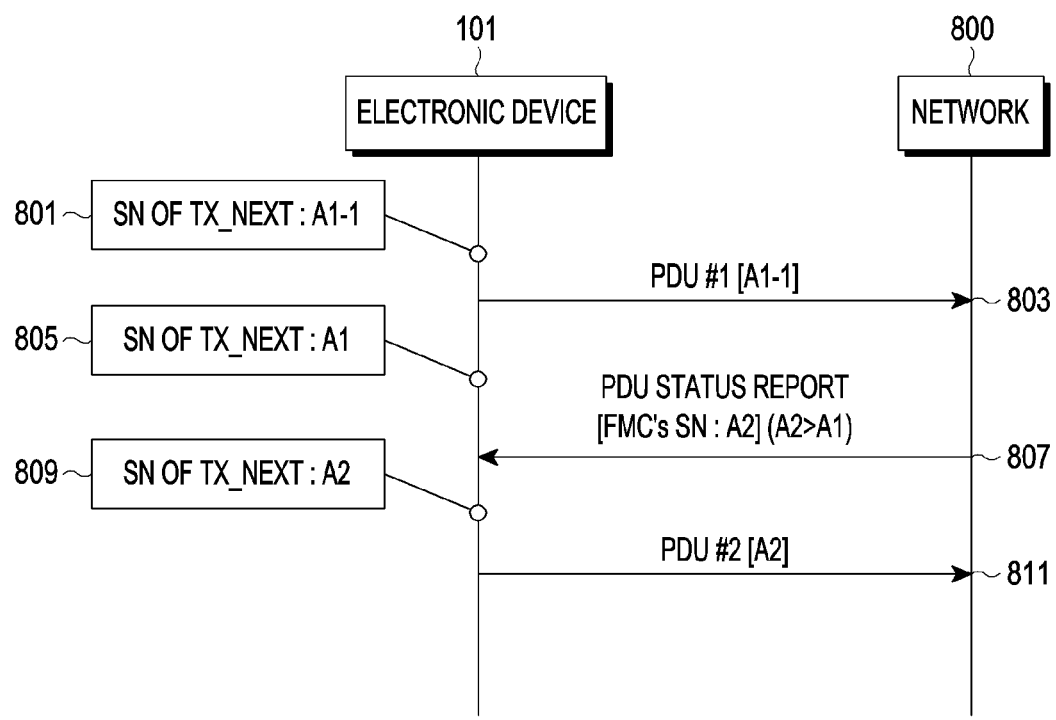
FIG. 8A is a signal flow diagram illustrating an example method for operating an electronic device according to an embodiment.
Figure 8B:
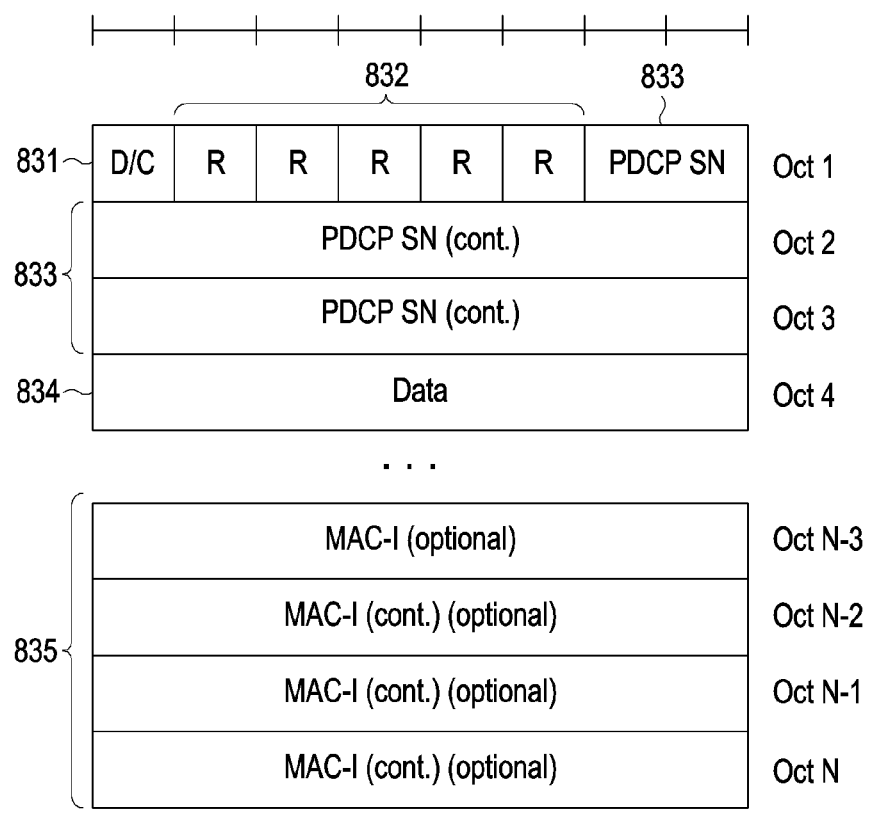
FIG. 8B is a diagram illustrating an example format of PDCP data PDU according to an embodiment.

FIG. 8A is a signal flow diagram illustrating an example method for operating an electronic device according to an embodiment. The embodiment of FIG. 8A is described with reference to FIG. 8B. FIG. 8B is a diagram illustrating an example format of PDCP data PDU according to an embodiment.

FIG. 8A illustrates example operations for transmitting an uplink message of an electronic device 101 to a network 800.

According to an embodiment, an electronic device 101 (e.g., at least one of the processor 120, the first communication processor 212, the second communication processor 214, the integrated communication processor 260, or the integrated SoC) may set (or maintain) the SN part of the TX_NEXT to A1−1 in operation 801. A−1−A1, and A2 shown in FIG. 8A may be the SN, e.g., as a natural number value which may follow the format set in the PDCP SN field 833 of FIG. 8B. In operation 803, the electronic device 101 may transmit a first PDU (PDU #1) to the network 800. The SN of the first PDU (PDU #1) may be A1−1. For example, the electronic device 101 may transmit a PDCP data PDU with a format as shown in FIG. 8B to the network 800. The PDCP data PDU may be configured with, e.g., N octets. A first octet Oct1 may include some of a data/control (D/C) field 831, a reserved field 832, and a PDCP SN field 833. A second octet Oct2 and a third octet Oct3 may include the rest of the PDCP SN field 833. The value of the D/C field 831 may indicate whether the PDU is a data PDU or a control PDU. A fourth octet Oct4 through an N-4th octet may include a data field 834. An N-3th octet Oct N-3 through an Nth octet Oct4 may optionally include an MAC-I field 835. For example, the electronic device 101 may transmit a first PDU (PDU #1) which includes a bit indicating A1−1 in the PDCP SN field 833 to the network 800 in operation 803.

According to an embodiment, after transmitting the first PDU (PDU #1), the electronic device 101 may update the TX_NEXT in operation 805. For example, the electronic device 101 may increase the SN part of the TX_NEXT to A1 which is one greater than the prior value. For example, the example shown in FIG. 8A assumes that the HFN remains unchanged. According to an embodiment, the electronic device 101 may receive a control PDU of PDCP status report from the network 800 in operation 807. For example, the electronic device 101 may receive a control PDU whose SN part is A2, of the FMC field 624 of FIG. 6B. It is assumed that the FMC of the control PDU is greater than (or not less than) the TX_NEXT.

According to an embodiment, in operation 809, the electronic device 101 may update the TX_NEXT to the received FMC based on the FMC of the control PDU being greater than (or not less than) the TX_NEXT. Thus, the SN of the updated TX_NEXT may be A2. In operation 811, the electronic device 101 may transmit a second PDU (PDU #2) to the network 800. The SN of the second PDU (PDU #2) may be set to A2, but not A1. Thus, the network 800 may refrain from discarding packets until the PDU of the SN expected is received.

Figure 9:
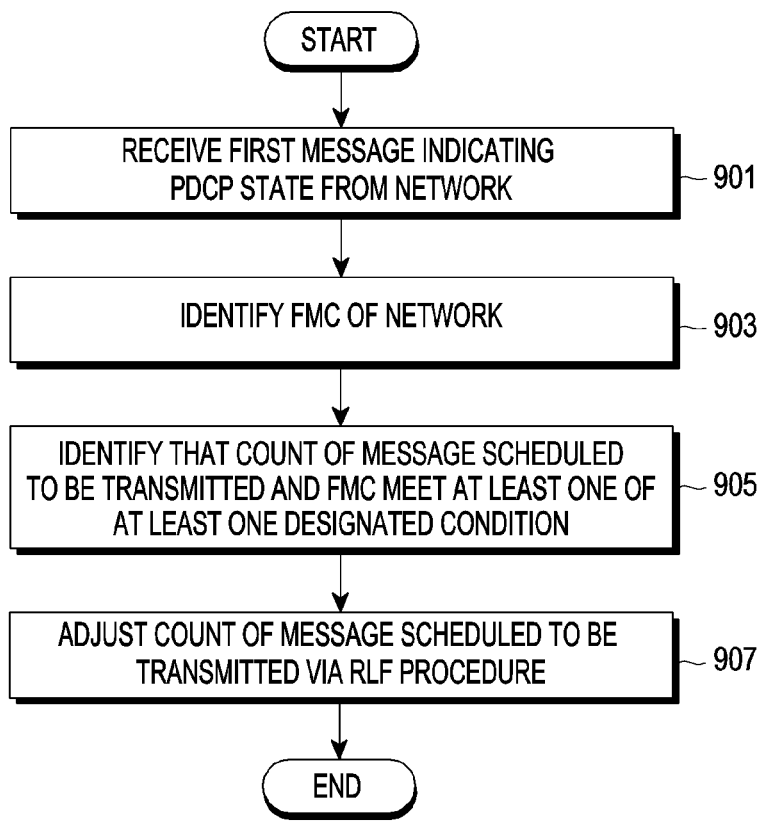
FIG. 9 is a flowchart illustrating an example method for operating an electronic device according to an embodiment.

FIG. 9 is a flowchart illustrating an example method for operating an electronic device according to an embodiment. FIG. 9 illustrates operations for transmitting an uplink message of an electronic device 101 to a network 800.

According to an embodiment, an electronic device 101 (e.g., at least one of the processor 120, the first communication processor 212, the second communication processor 214, the integrated communication processor 260, or the integrated SoC) may receive a first message indicating the PDCP status from a network 800 in operation 901. For example, the electronic device 101 may receive a PDCP control PDU with a format as shown in FIG. 6B. In operation 903, the electronic device 101 may identify the first missing count (FMC) of the network. For example, the electronic device 101 may identify the first missing count based on the value of the FMC field 624 of the PDCP control PDU with a format as shown in FIG. 6B.

According to an embodiment, the electronic device 101 may identify that the count of the message scheduled to be transmitted and the first missing count meet at least one of at least one designated condition in operation 905. For example, the electronic device 101 may identify whether the count of the message scheduled to be transmitted is less than (or not more than) the first missing count, as the operation of identifying whether a first condition among the at least one condition is met. Alternatively, the electronic device 101 may identify whether the count of the message scheduled to be transmitted is a designated value or more, greater than the first missing count, as the operation of identifying whether a second condition among the at least one condition is met. For example, the electronic device 101 may identify whether Equation 1 is met, as identifying whether the second condition is met.

$$\text{TX\_NEXT}-X > \text{FMC} \quad \text{[Equation 1]}$$

In Equation 1, the TX_NEXT may be one managed by the electronic device 101, or the FMC may be one received from the electronic device 101. Whether the TX_NEXT−X in Equation 1 is greater than the FMC may be varied to whether TX_NEXT−X is not less than the FMC. In Equation 1, X may be set based on the number of PDUs that may be transferred during a reordering timer in an example. X may be set based on, e.g., Equation 2.

$$X = \text{Maxthroughput}/\text{MTUsize} \times \text{reorderingtimer} \quad \text{[Equation 2]}$$

In Equation 2, Max throughput may be the maximum throughput, MTU size may be the size of maximum transmission unit (MTU), and reordering timer may be the time of the reordering timer. For example, when Max throughput is 100 Mbps, MTU size is 1500 bytes, and reordering timer is 100 ms, X may be 100,000,000/(1500 Bytes*8 bit) *0.1=833. If the reordering timer is 0, the electronic device 101 may identify X by applying a designated value (e.g., 1 ms) of the reordering timer to Equation 2.

According to an embodiment, X may be set according to bandwidth information for the cell which is providing a packet service and, as an example, may be set as shown, for example, in Table 1.

TABLE 1

| | Bandwidth | | | | | |
|---|---|---|---|---|---|---|
| 5 | 10 | 15 | 20 | 25 | 30 | 40 |
| X 800 | 1600 | 2400 | 3200 | 4000 | 4800 | 6400 |
| | Bandwidth | | | | | |
| 50 | 60 | 80 | 90 | 100 | 200 | 400 |
| X 8000 | 9600 | 12800 | 14400 | 16000 | 32000 | 64000 |

According to an embodiment, X may be set according to the max throughput and, as an example, may be set as shown, for example, in Table 2.

TABLE 2

| | Max Throughput(X) | | | | | |
|---|---|---|---|---|---|---|
| 100 | 200 | 300 | 400 | 500 | 600 | 800 |
| X 800 | 1600 | 2400 | 3200 | 4000 | 4800 | 6400 |
| | Max Throughput(X) | | | | | |
| 1000 | 1200 | 1600 | 1800 | 2000 | 4000 | 8000 |
| X 8000 | 9600 | 12800 | 14400 | 16000 | 32000 | 64000 |

According to an embodiment, X may be a designated constant.

According to an embodiment, the electronic device 101 may identify that at least one condition (e.g., the above-described first condition and/or second condition) is met and, based thereupon, adjust the count of the message scheduled to be transmitted via a radio link failure (RLF) procedure in operation 907. The electronic device 101 may prevent and/or reduce data stall by reestablishing a connection and address a count mismatch.

Figure 10A:
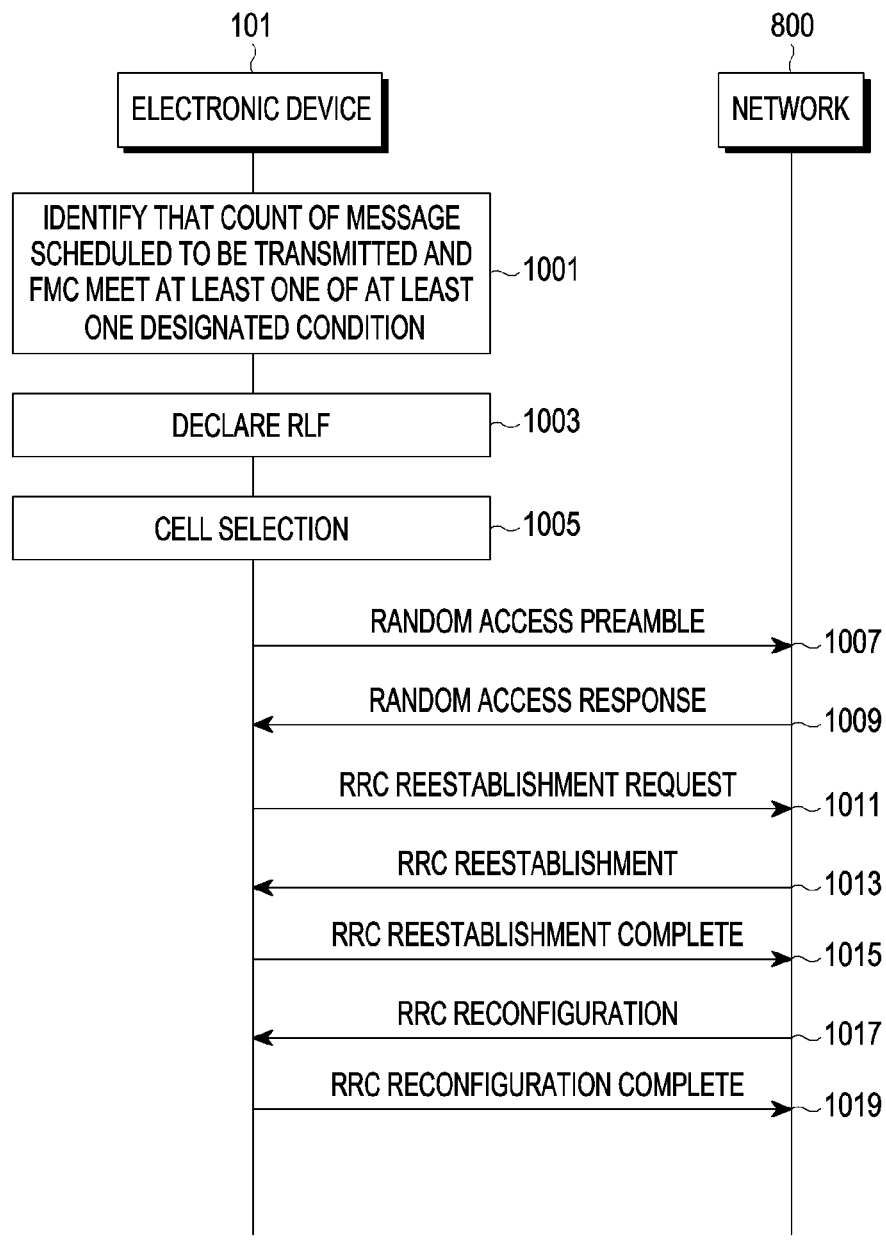
FIG. 10A is a signal flow diagram illustrating an example method for operating an electronic device according to an embodiment.

FIG. 10A is a signal flow diagram illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may identify that the count of the message scheduled to be transmitted and the first missing count (FMC) meet at least one designated condition in operation 1001. For example, as described above in connection with FIG. 9, the electronic device 101 may identify that the TX_NEXT and FMC meet, e.g., Equation 1 or Equation 2.

According to an embodiment, the electronic device 101 may declare an RLF in operation 1003. For example, the electronic device 101 may perform at least one operation configured corresponding to the RLF. When an issue occurs with the unacknowledged mode (UM) bearer, the electronic device 101 may perform an RRC reestablishment procedure. For example, the electronic device 101 may perform cell selection in operation 1005. The electronic device 101 may perform cell selection based on the result of measurement on the network 800 (e.g., a cell) meeting a cell selection condition. The electronic device 101 may camp on, e.g., a suitable cell. In operation 1007, the electronic device 101 may transmit a random access preamble for the camped-on cell. In operation 1009, the electronic device 101 may receive a random access response from the camped-on cell of the network 800. In operation 1011, the electronic device 101 may transmit an RRC reestablishment request. In operation 1013, the network 800 may transmit an RRC reestablishment to the electronic device 101. In operation 1015, the electronic device 101 may transmit an RRC reestablishment complete to the network 800. In operation 1017, the network 800 may transmit an RRC reconfiguration to the electronic device 101. In operation 1019, the electronic device 101 may transmit an RRC reconfiguration complete to the network 800. Since in the case of UM bearers, the TX_NEXT is initialized upon PDCP reestablishing, the count mismatch between the electronic device 101 and the network 800 may be addressed.

Figure 10B:
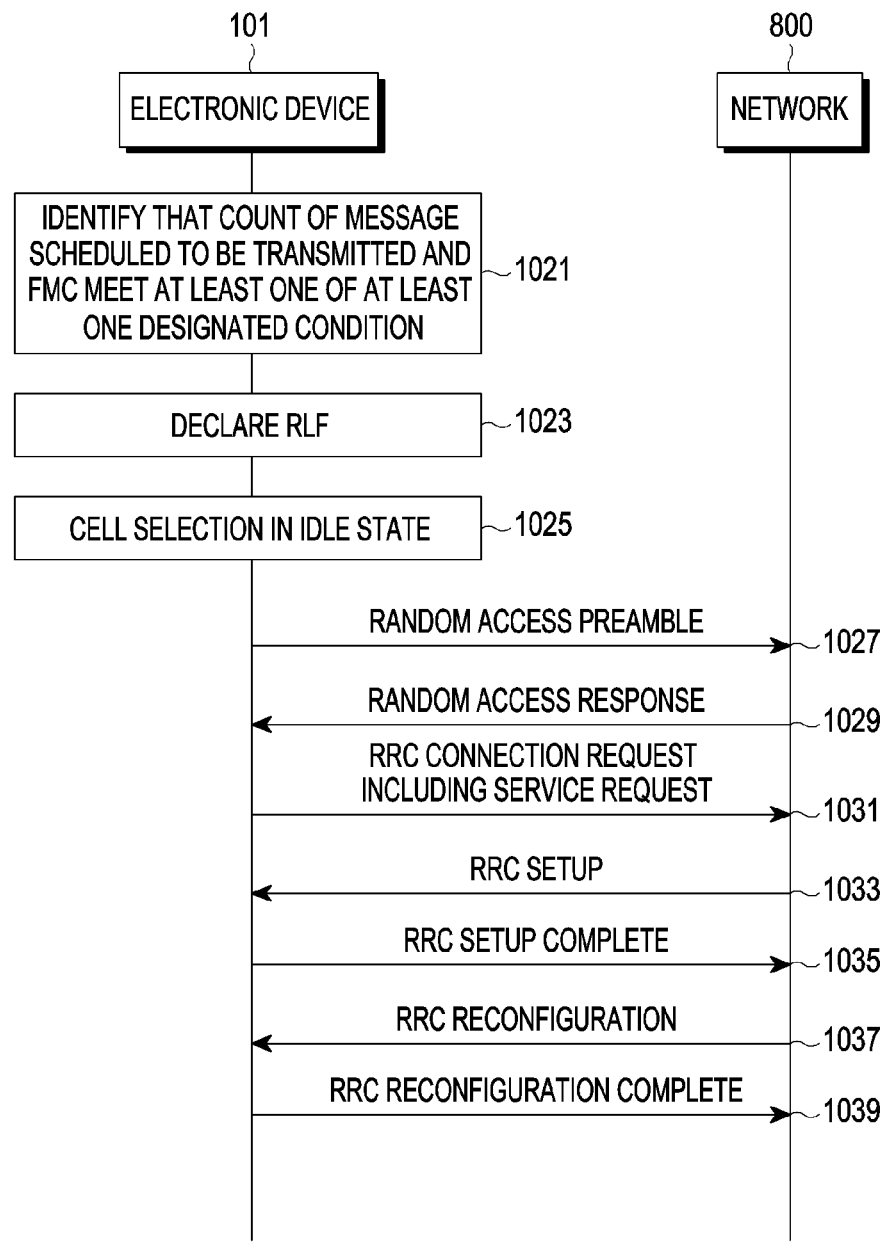
FIG. 10B is a signal flow diagram illustrating an example method for operating an electronic device according to an embodiment.

FIG. 10B is a signal flow diagram illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may identify that the count of the message scheduled to be transmitted and the first missing count (FMC) meet at least one designated condition in operation 1021. For example, as described above in connection with FIG. 9, the electronic device 101 may identify that the TX_NEXT and FMC meet, e.g., Equation 1 or Equation 2.

According to an embodiment, the electronic device 101 may declare an RLF in operation 1023. For example, the electronic device 101 may perform at least one operation configured corresponding to the RLF. When an issue occurs with the acknowledgement mode (AM) bearer, the electronic device 101 may switch to the RRC_IDLE state and, for later data generated, reestablish an RRC connection via a SERVICE REQUEST procedure. For example, the electronic device 101 may perform cell selection in the idle state (e.g., an RRC_IDLE state) in operation 1025. In operation 1027, the electronic device 101 may transmit a random access preamble to the network 800 (e.g., a suitable cell) camped on as a result of the cell selection. In operation 1029, the network 800 may transmit a random access response to the electronic device 101.

According to an embodiment, in operation 1031, the electronic device 101 may transmit an RRC connection request including a SERVICE REQUEST to the network 800. In operation 1033, the network 800 may transmit an RRC setup to the electronic device 101. In operation 1035, the electronic device 101 may transmit an RRC setup complete to the network 800. In operation 1037, the network 800 may transmit an RRC reconfiguration to the electronic device 101. In operation 1039, the electronic device 101 may transmit an RRC reconfiguration complete to the network 800. Since in the case of AM bearers, the TX_NEXT is not initialized upon PDCP reestablishing, the count mismatch between the electronic device 101 and the network 800 may be addressed by the above-described scheme.

Figure 11:
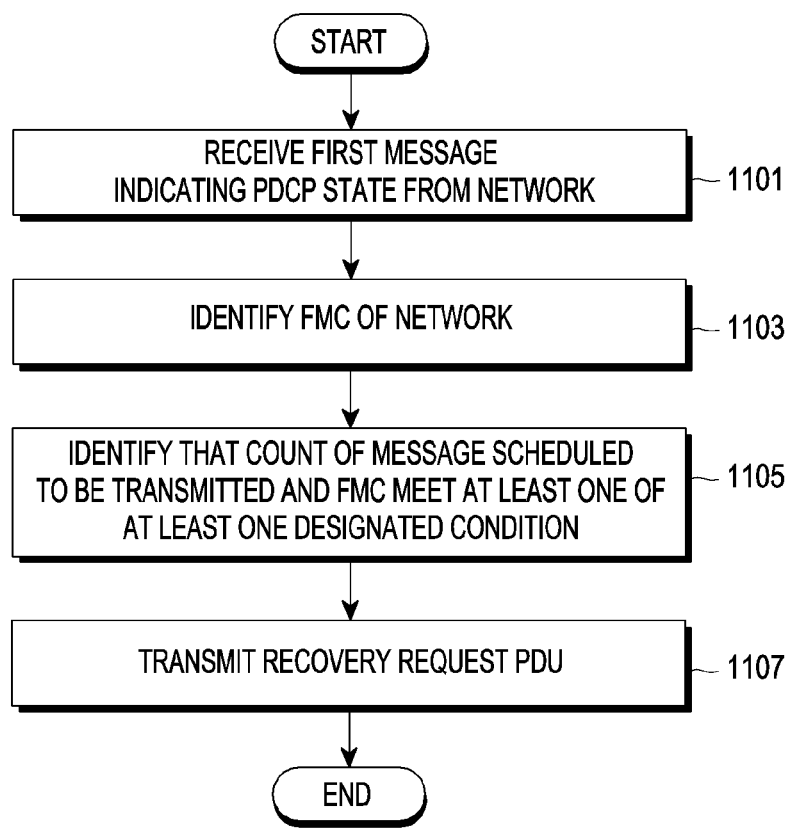
FIG. 11 is a flowchart illustrating an example method for operating an electronic device according to an embodiment.

FIG. 11 is a flowchart illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a first message indicating the PDCP status from a network 800 in operation 1101. In operation 1103, the electronic device 101 may identify the first missing count (FMC) of the network 800. For example, the electronic device 101 may receive a PDCP control PDU with a format as shown in FIG. 6B. In operation 1103, the electronic device 101 may identify the first missing count of the network. For example, the electronic device 101 may identify the first missing count based on the value of the FMC field 624 of the PDCP control PDU with a format as shown in FIG. 6B. In operation 1105, the electronic device 101 may identify that the count of the message scheduled to be transmitted and the first missing count meet at least one of at least one designated condition. For example, as described above in connection with FIG. 9, the electronic device 101 may identify that the TX_NEXT and FMC meet, e.g., Equation 1 or Equation 2.

According to an embodiment, in operation 1107, the electronic device 101 may transmit a PDU to request recovery to the network 800. For example, the electronic device 101 may transmit a control PDU with a format as shown in FIG. 6B to the network 800. The electronic device 101 may transmit a control PDU, which includes a recovery request value (e.g., 010) in the PDU type field 622 with a format as shown in FIG. 6B, to the network 800. "010" denotes, e.g., PDCP recovery required and may be shared by the electronic device 101 and the network 800. Thus, the network 800 may identify whether the electronic device 101 sends a request for recovery due to a count mismatch. Upon identifying the recovery request, the network 800 may perform recovery by reconfiguring the PDCP via RRC reconfiguration.

Figure 12A:
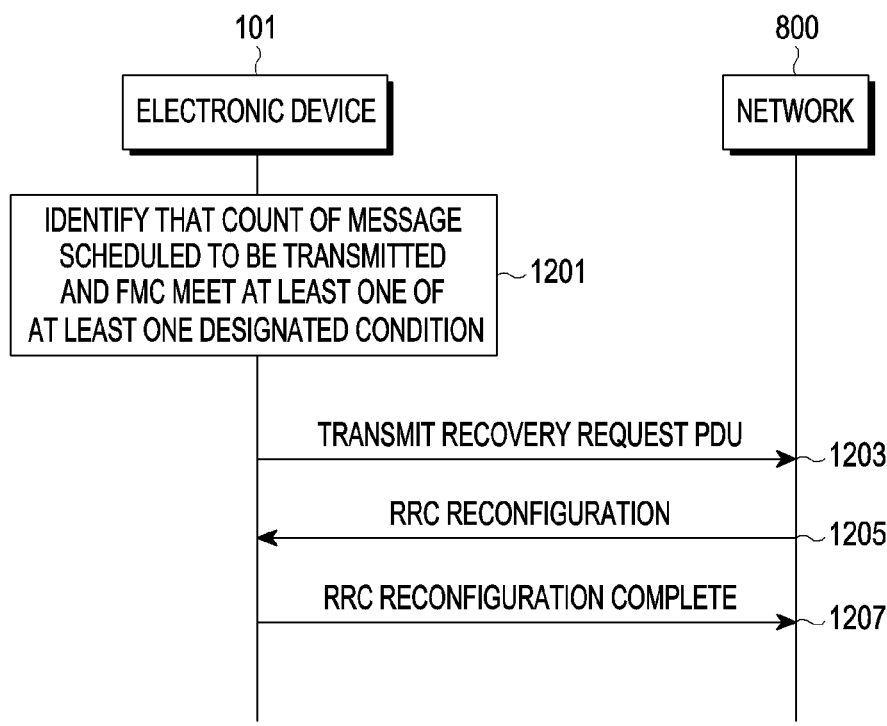
FIG. 12A is a signal flow diagram illustrating an example method for operating an electronic device according to an embodiment.

FIG. 12A is a signal flow diagram illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may identify that the count of the message scheduled to be transmitted and the first missing count (FMC) meet at least one designated condition in operation 1201. For example, as described above in connection with FIG. 9, the electronic device 101 may identify that the TX_NEXT and FMC meet, e.g., Equation 1 or Equation 2.

According to an embodiment, in operation 1203, the electronic device 101 may transmit a recovery request PDU (e.g., PDCP Control PDU with PDU type Bit 010, PDCP Recovery required) to the network 800. For example, upon sensing an issue with the UM bearer, the electronic device 101 may transmit a control PDU, which includes a recovery request value (e.g., 010) in the PDU type field 622 with a format as shown in FIG. 6B, to the network 800. In operation 1205, the network 800 may transmit an RRC reconfiguration message (e.g., RRC reconfiguration with reestablish PDCP for the UM bearer) to the electronic device 101. In operation 1207, the electronic device 101 may transmit an RRC reconfiguration complete message to the network 800. Thus, the electronic device 101 and the network 800 may reconfigure the count via PDCP reconfiguration and address the count mismatch.

Figure 12B:
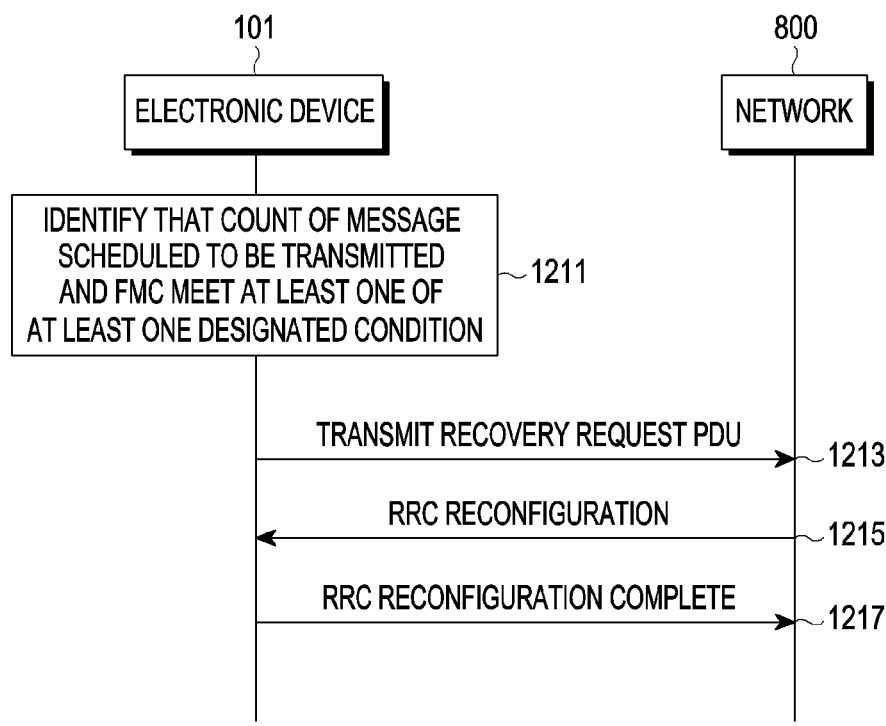
FIG. 12B is a signal flow diagram illustrating an example method for operating an electronic device according to an embodiment.

FIG. 12B is a signal flow diagram illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may identify that the count of the message scheduled to be transmitted and the first missing count (FMC) meet at least one designated condition in operation 1211. For example, as described above in connection with FIG. 9, the electronic device 101 may identify that the TX_NEXT and FMC meet, e.g., Equation 1 or Equation 2.

According to an embodiment, in operation 1213, the electronic device 101 may transmit a recovery request PDU (e.g., PDCP Control PDU with PDU type Bit 010, PDCP Recovery required) to the network 800. For example, upon sensing an issue with the AM bearer, the electronic device 101 may transmit a control PDU, which includes a recovery request value (e.g., 010) in the PDU type field 622 with a format as shown in FIG. 6B, to the network 800. In operation 1215, the network 800 may transmit an RRC reconfiguration message (e.g., RRC Reconfiguration with fullconfig and DRB setup) to the electronic device 101. In operation 1217, the electronic device 101 may transmit an RRC reconfiguration complete message to the network 800. Thus, the electronic device 101 and the network 800 may reconfigure the count via full config and DRB setup and address the count mismatch.

Figure 13:
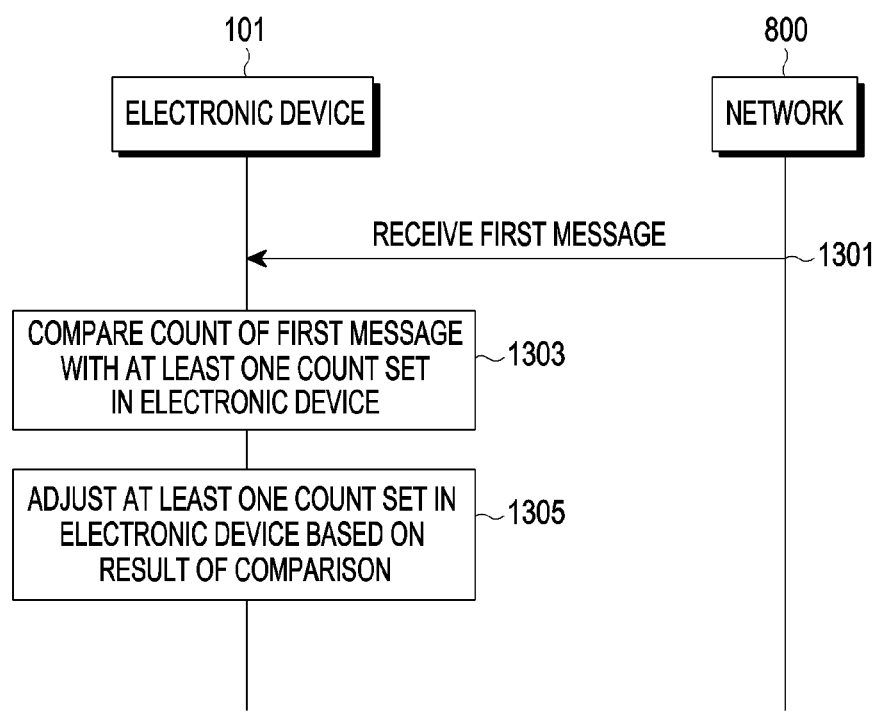
FIG. 13 is a signal flow diagram illustrating an example method for operating an electronic device according to an embodiment.

FIG. 13 is a signal flow diagram illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a first message from a network 800 in operation 1301. For example, the electronic device 101 may receive a data PDU with a format as shown in FIG. 8B from the network 800 via the DL. The first message may include an SN. For example, the PDCP SN field 833 of FIG. 8B may include an SN.

According to an embodiment, in operation 1303, the electronic device 101 may compare the count of the first message with at least one count set in the electronic device. The electronic device 101 may identify the count of the first message based on the SN included in the first message and the HFH managed. The receiving PDCP entity may manage (or retain) the following example state variables:

a) RX_NEXT: This state variable denotes the count value of the next PDCP SDU expected to be received and its initial value may be 0.

b) RX_DELIV: This state variable may denote the count value of the first PDCP SDU which is not transferred to the upper layers but still waits.

c) RX_REORD: This state variable may denote the count value following the count value associated with the PDCP data PDU that has triggered t-reordering.

When reported to the transmitting PDCP entity, RX_DELIV may be reported as the FMC.

The electronic device 101 may compare the count of the first message with at least one of the above-described state variables retained in the receiving PDCP entity. In operation 1305, the electronic device 101 may adjust at least one count, e.g., at least one of the state variables, set in the electronic device 101 based on the result of comparison. As an example, when the count of the received message is less than RX_DELIV, e.g., when the sum of the count of the received message and a designated value is less than RX_DELIV, the electronic device 101 may determine that the condition for adjustment has been met. Or, when the count of the received message is greater than RX_NEXT, e.g., when the count of the received message is greater than the sum of RX_NEXT and a designated value, the electronic device 101 may determine that the condition for adjustment has been met. The designated value may be determined as in the example described above in connection with Equation 1 (e.g., 833), but this is merely an example, and embodiments of the disclosure are not limited thereto. A method of setting the designated value is described with reference to FIG. 14A and/or FIG. 14B. The designated values associated with FIG. 13 and the designated value associated with Equation 1 and FIG. 6A may differ from each other or may be identical. Designated values for addressing the count mismatch issue due to retransmission of HARQ or RLC depending on the DL channel context may be configured and this is described below.

Figure 14A:
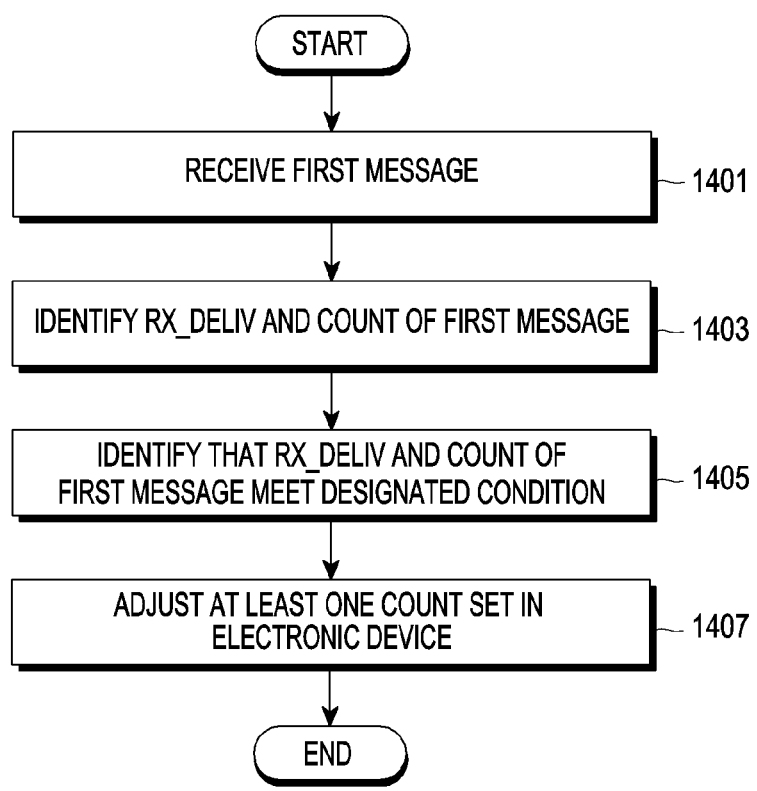
FIG. 14A is a flowchart illustrating an example method for operating an electronic device according to an embodiment.

FIG. 14A is a flowchart illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a first message in operation 1401. In operation 1403, the electronic device 101 may identify the count of the first message and RX_DELIV. The electronic device 101 may identify the count of the first message based on the retained HFN and the SN in the PDCP SN field 833 of FIG. 8B. The electronic device 101 may identify the retained RX_DELIV.

According to an embodiment, in operation 1405, the electronic device 101 may identify that the count of the first message and the RX_DELIV meet a designated condition. For example, the electronic device 101 may identify that the count of the first message and the RX_DELIV meet Equation 3.

$$\text{RCVD-COUNT} < \text{RX\_DELIV} - Y \qquad \text{[Equation 3]}$$

In Equation 3, RCVD_COUNT may be the count of the received message, and Y may be the designated value. Whether the value of RCVD_COUNT in Equation 3 is less than RX_DELIV−Y may be varied to whether the value of RCVD_COUNT is not more than RX_DELIV−Y. Y may be set based on at least some of the above-described schemes for setting X. Or, since Y is a value corresponding to where the SN for the PDU where reordering has already been complete and an RLC ACK has been transferred, Y may be set to a designated constant (e.g., 10). Upon identifying that the designated condition is met (e.g., when Equation 3 is met), the electronic device 101 may adjust at least one count (e.g., at least one of RX_NEXT, RX_DELIV, or RX_REORD) set in the electronic device 101 in operation 1407.

Figure 14B:
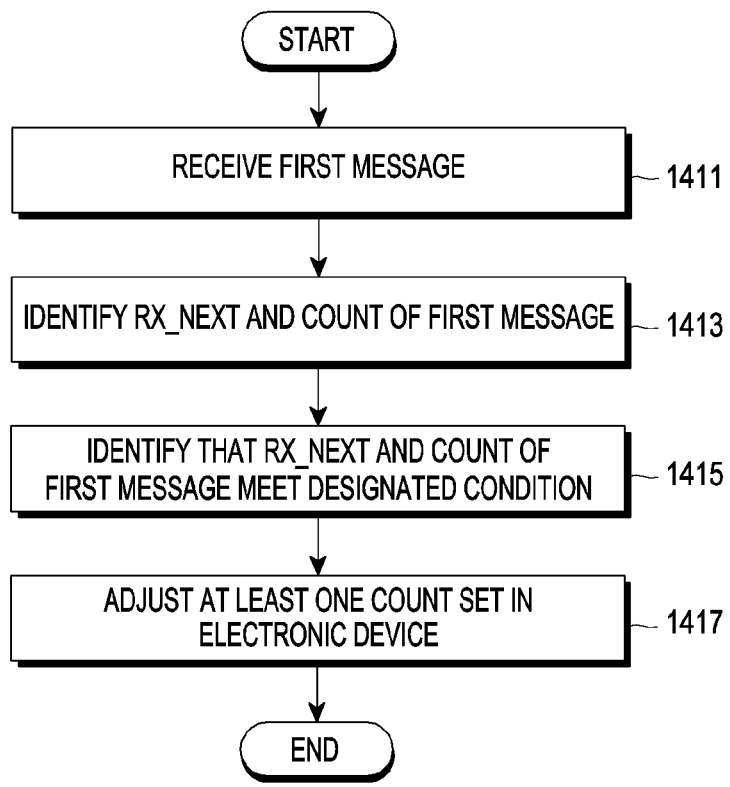
FIG. 14B is a flowchart illustrating an example method for operating an electronic device according to an embodiment.

FIG. 14B is a flowchart illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a first message in operation 1411. In operation 1413, the electronic device 101 may identify the count of the first message and RX_NEXT. The electronic device 101 may identify the count of the first message based on the retained HFN and the SN in the PDCP SN field 833 of FIG. 8B. The electronic device 101 may identify the retained RX_NEXT.

According to an embodiment, in operation 1415, the electronic device 101 may identify that the count of the first message and the RX_NEXT meet a designated condition. For example, the electronic device 101 may identify that the count of the first message and the RX_NEXT meet Equation 4.

$$\text{RCVD\_COUNT} > \text{RX\_NEXT} + Z \qquad \text{[Equation 4]}$$

In Equation 4, RCVD_COUNT may be the count of the received message, and Z may be the designated value. Whether the value of RCVD_COUNT in Equation 4 is greater than RX_NEXT+Z may be varied to whether the value of RCVD_COUNT is not less than RX_NEXT+Z. Z may be set based on at least some of the above-described schemes for setting X. At least some of X, Y, and Z in Equations 1, 3, and 4 may be identical to or different from each other. Upon identifying that the designated condition is met (e.g., when Equation 4 is met), the electronic device 101 may adjust at least one count (e.g., at least one of RX_NEXT, RX_DELIV, or RX_REORD) set in the electronic device 101 in operation 1417.

Figure 15:
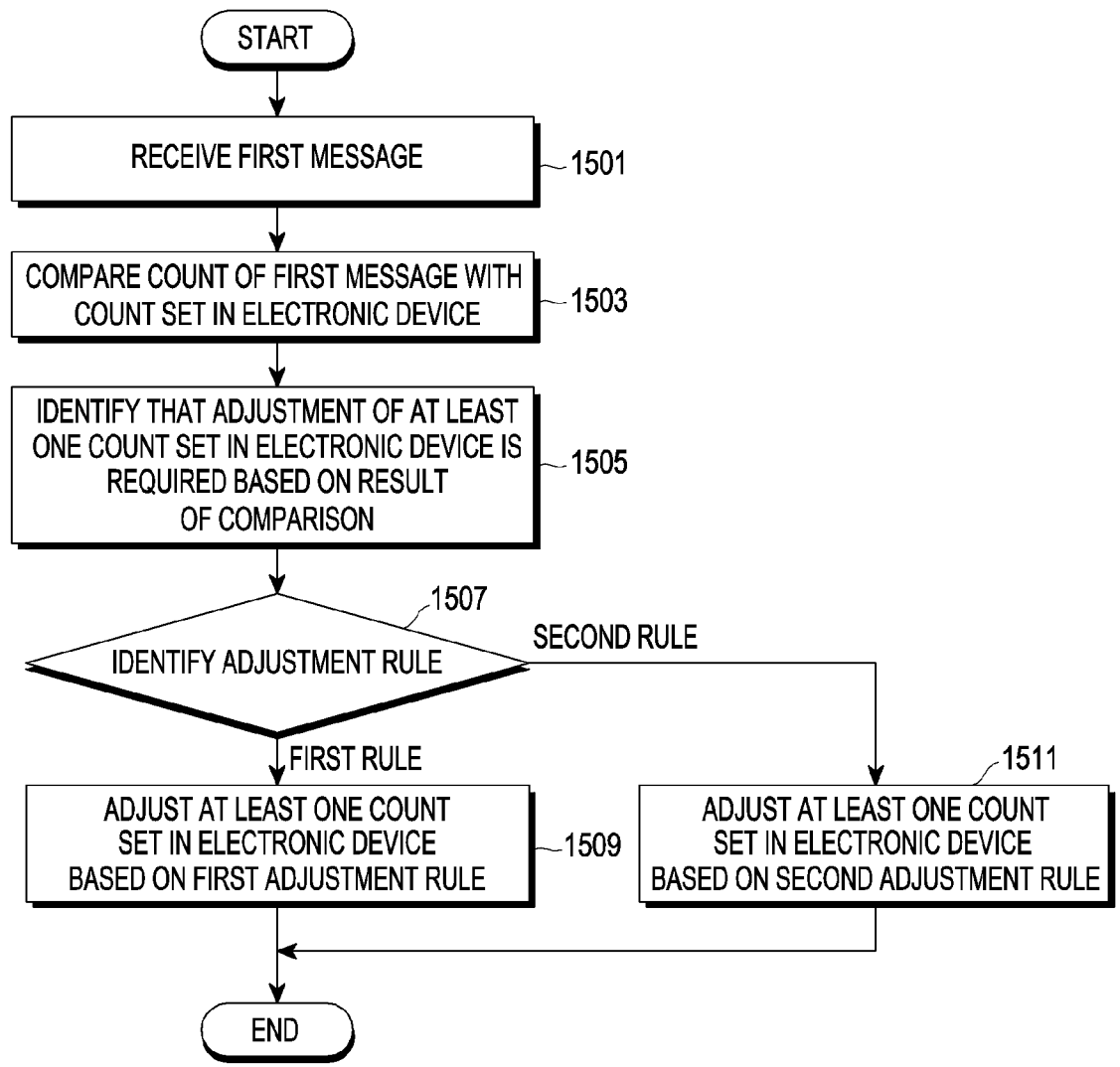
FIG. 15 is a flowchart illustrating an example method for operating an electronic device according to an embodiment.
Figure 16A:
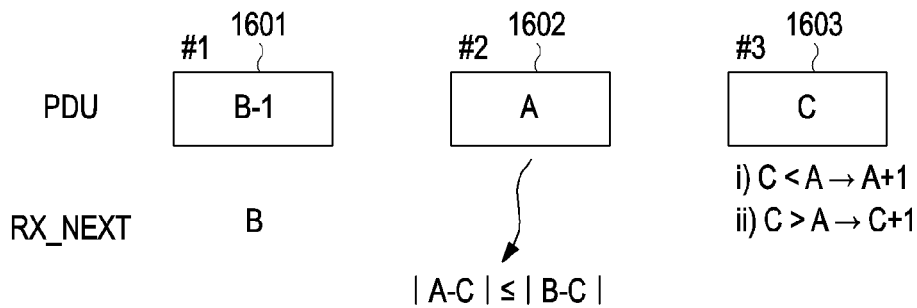
FIGS. 16A and 16B are diagrams illustrating an example of a PDU and count received according to an embodiment.
Figure 16B:
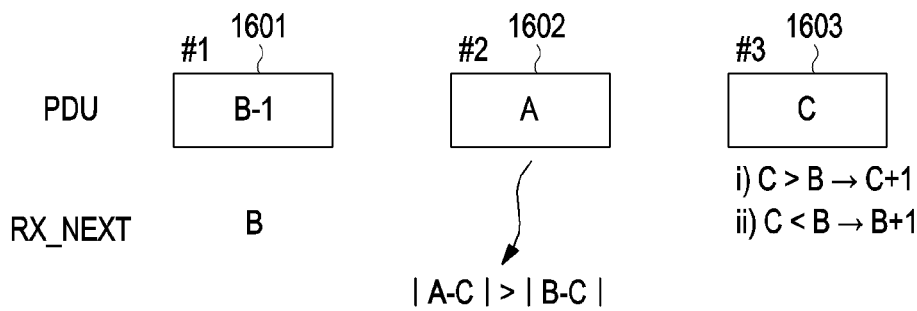

FIG. 15 is a flowchart illustrating an example method for operating an electronic device according to an embodiment. The embodiment of FIG. 15 is described with reference to FIGS. 16A and 16B. FIGS. 16A and 16B are diagrams illustrating an example of a PDU and count received according to an embodiment.

According to an embodiment, an electronic device 101 (e.g., at least one of the processor 120, the first communication processor 212, the second communication processor 214, the integrated communication processor 260, or the integrated SoC) may receive a first message in operation 1501. In operation 1503, the electronic device 101 may compare the count of the first message with at least one count set in the electronic device, e.g., at least one of the RX_NEXT, RX_DELIV, or RX_REORD. In operation 1505, the electronic device 101 may identify that adjustment of at least one count set in the electronic device 101 is required, based on the result of comparison. For example, the electronic device 101 may identify that Equation 3 or 4 is met.

According to an embodiment, the electronic device 101 may identify an adjustment rule in operation 1507. The electronic device 101 may select any one adjustment rule among a plurality of adjustment rules. For example, Equation 5 may be a condition for selecting an adjustment rule.

$$|A-C| => |B-C| \qquad \text{[Equation 5]}$$

In Equation 5, A may be the count of the PDU that causes a count mismatch, B may be the RX_NEXT value immediately before receiving the PDU, and C may be the count of the next PDU received after the corresponding PDU is received. For example, when Equation 5 is identified to be met, the electronic device 101 may select a first adjustment rule and, when Equation 5 is identified not to be met, the electronic device 101 may select a second adjustment rule.

According to an embodiment, when the first adjustment rule is selected, the electronic device 101 may adjust at least one count set in the electronic device based on the first adjustment rule in operation 1509. For example, referring to FIG. 16A, the electronic device 101 may receive a first PDU 1601 from the network 800 at a first time. The count of the first PDU 1601 may be B−1. The electronic device 101 may manage the RX_NEXT as B. The electronic device 101 may receive a second PDU 1602 from the network 800 at a second time. The count of the second PDU 1602 may be A. The electronic device 101 may identify a count mismatch due to the second PDU 1602. For example, the electronic device 101 may identify that Equation 4, e.g., A>B+Z, is met. The electronic device 101 may identify the second PDU 1602 as causing the count mismatch.

Thereafter, the electronic device 101 may receive a third PDU 1603 from the network 800 at a third time. The count of the second PDU 1602 may be C. For example, the electronic device 101 may identify that Equation 5, e.g., |A−C|=<|B−C|, is met and may thus select the first adjustment rule. |A−C|=<|B−C| being met may refer, for example, to the SN transmitted from the network 800 having a high accuracy, and the first adjustment rule may be one based on A, according to the received SN, rather than B retained in the electronic device 101. For example, when A is greater than C as shown in FIG. 16A, the electronic device 101 may update RX_NEXT to A+1. When C is greater than A, the electronic device 101 may update RX_NEXT to C+1. In this case, the electronic device 101 may refrain from discarding the second PDU 1602.

According to an embodiment, when the second adjustment rule is selected, the electronic device 101 may adjust at least one count set in the electronic device based on the second adjustment rule in operation 1511. For example, the electronic device 101 may identify that Equation 5, e.g., |A−C|=<|B−C|, is not met and may thus select the second adjustment rule. |A−C|=<|B−C| being not met may refer, for example, to the SN transmitted from the network 800 having a low accuracy, and the second adjustment rule may be one based on B retained in the electronic device 101, rather than A according to the received SN. When the state variable is updated based on A, the PDUs with a count less than A, received thereafter, are all discarded. Thus, the second adjustment rule may be based on B retained in the electronic device 101. For example, when C is greater than B as shown in FIG. 16B, the electronic device 101 may update RX_NEXT to C+1. When B is greater than C, the electronic device 101 may update RX_NEXT to B+1.

The above-described adjustment of RX_NEXT is merely an example. According to an embodiment, the electronic device 101 may adjust the RX_DELIV and/or RX_REORD as well as the RX_NEXT.

According to an embodiment, the electronic device 101 may perform adjustment via the RLF described above in connection with FIGS. 9, 10A, and 10B, as well as by the above-described first adjustment rule and second adjustment rule. Or, the electronic device 101 may perform adjustment by transmitting a control PDU for requesting recovery, described above in connection with FIGS. 11, 12A, and 12B, to the network 800.

Figure 17:
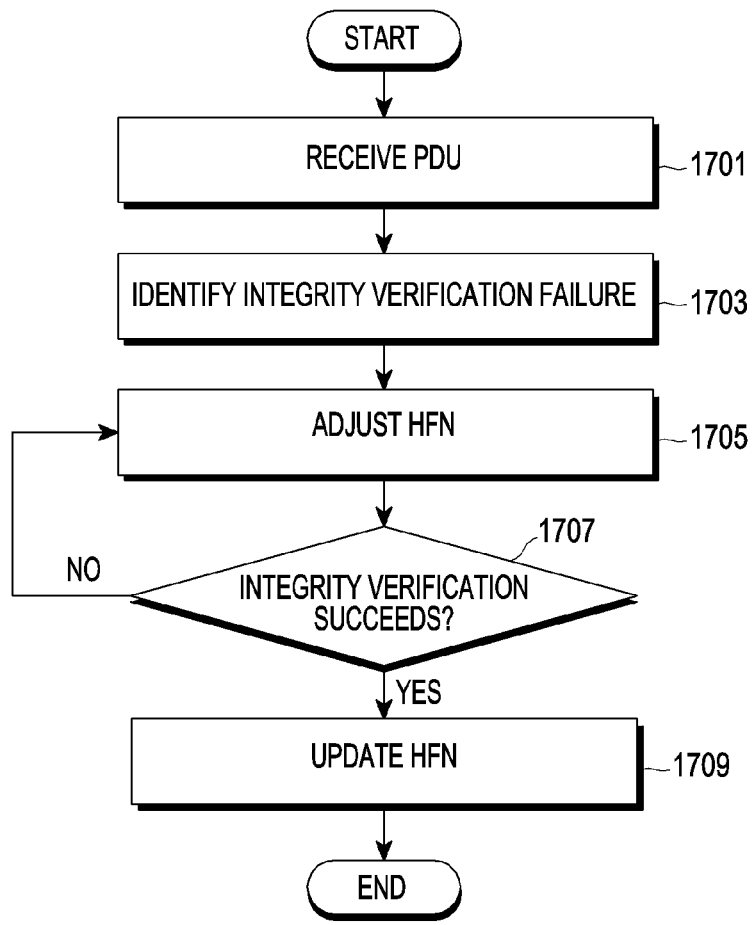
FIG. 17 is a flowchart illustrating an example method for operating an electronic device according to an embodiment.

FIG. 17 is a flowchart illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a PDU from a network 800 in operation 1701. For example, the electronic device 101 may receive a PDCP data PDU with a format as shown in FIG. 8B.

According to an embodiment, the electronic device 101 may identify a failure in integrity verification in operation 1703. For example, the electronic device 101 may identify the received MAC-I based on the value included in the MAC-I field 835. The electronic device 101 may identify the XMAC-I as described above in connection with FIG. 5C. The electronic device 101 may perform integrity verification based on the comparison between XMAC-I and MAC-I. If XMAC-I and MAC-I are identical to each other, the electronic device 101 may determine that integrity verification has succeeded. Unless XMAC-I and MAC-I are identical to each other, the electronic device 101 may determine that integrity verification has failed. Upon determining that integrity verification has failed, the electronic device 101 may determine that there is a significant difference between the HFN managed by the electronic device 101 and the HFN managed by the network 800.

According to an embodiment, the electronic device 101 may adjust the HFN based on the integrity verification failure in operation 1705. An HFN adjustment rule is described below, but not limited thereto. In operation 1707, the electronic device 101 may again identify whether integrity verification has succeeded based on the adjusted HFN. As the HFN is adjusted, the count (COUNT) input from the receiving PDCP entity to the NIA in FIG. 5C may be adjusted as well.

According to an embodiment, if integrity verification succeeds (yes in 1707), the electronic device 101 may update the HFN and may confirm the adjusted HFN in operation 1709. If integrity verification fails again (no in 1707), the electronic device 101 may readjust the HFN in operation 1705. The electronic device 101 may adjust the HFN until integrity verification succeeds or, upon identifying integrity verification failure a designated number of times, adjust the HFN back to the initial value.

According to an embodiment, the electronic device 101 may determine whether the HFN matches or not after adjusting the state variable managed (or retained) in the electronic device 101 but the time of determination is not limited thereto. Upon receiving a PDU, the electronic device 101 may be configured to determine whether the HFN matches or not regardless of the time of determination or without limitations.

Although the operations of the electronic device 101 have been described above in connection with FIG. 17, it will be easily appreciated by one of ordinary skill in the art that the operations of FIG. 17 and the operations of FIGS. 18 and 19 described below may also be performed by the receiving PDCP entity and, in the case of UL, they may be performed by the network 800.

For reference, LTE (e.g., 3GPP TS 36.323) has conditions where the MAC-I field is limited and, for DRBs used by terminal devices, e.g., smartphones, use of the MAC-I field is limited. For example, according to NR (e.g., 3GPP TS 38.323), unlike legacy LTE, the MAC-I field is optionally available in the DRB, and use of the MAC-I field is not limited. Thus, according to NR, the electronic device 101 may perform integrity verification based on the value in the MAC-I field regardless of the kind of DRB.

Figure 18:
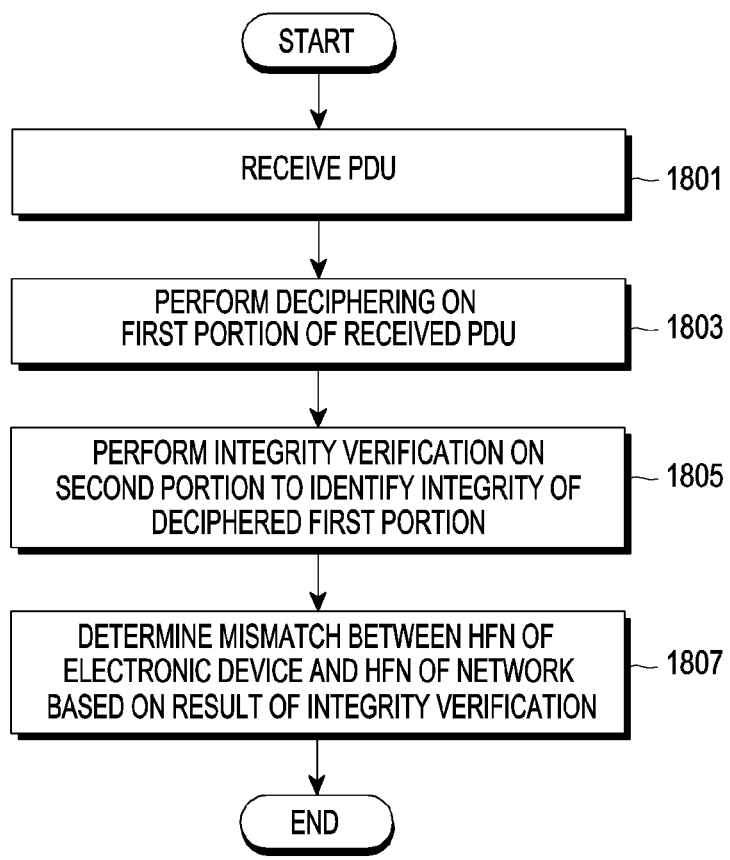
FIG. 18 is a flowchart illustrating an example method for operating an electronic device according to an embodiment.

FIG. 18 is a flowchart illustrating an example method for operating an electronic device according to an embodiment.

According to an embodiment, an electronic device 101 (e.g., at least one of the processor 120, the first communication processor 212, the second communication processor 214, the integrated communication processor 260, or the integrated SoC) may receive a PDU from a network 800 in operation 1801. For example, the electronic device 101 may receive a PDCP data PDU with a format as shown in FIG. 8B.

According to an embodiment, the electronic device 101 may perform deciphering on a first portion of a received PDU in operation 1803. For example, the electronic device 101 may perform deciphering on the data field 834 and MAC-I field 835 of FIG. 8B. For example, the electronic device 101 may perform deciphering as described above in connection with FIG. 5A. The electronic device 101 may perform integrity verification on a second portion for identifying the integrity of the deciphered first portion in operation 1805. The electronic device 101 may compare the value in the MAC-I field 835, which is the deciphered second portion, with the XMAC-I generated as described above in connection with FIG. 5C, thereby performing integrity verification. In operation 1807, the electronic device 101 may determine whether there is a mismatch between the HFN of the electronic device 101 and the HFN of the network 800 based on the result of integrity verification. Depending on whether the HFN matches, it may be identified whether to modify the HFN managed by the electronic device 101.

Figure 19:
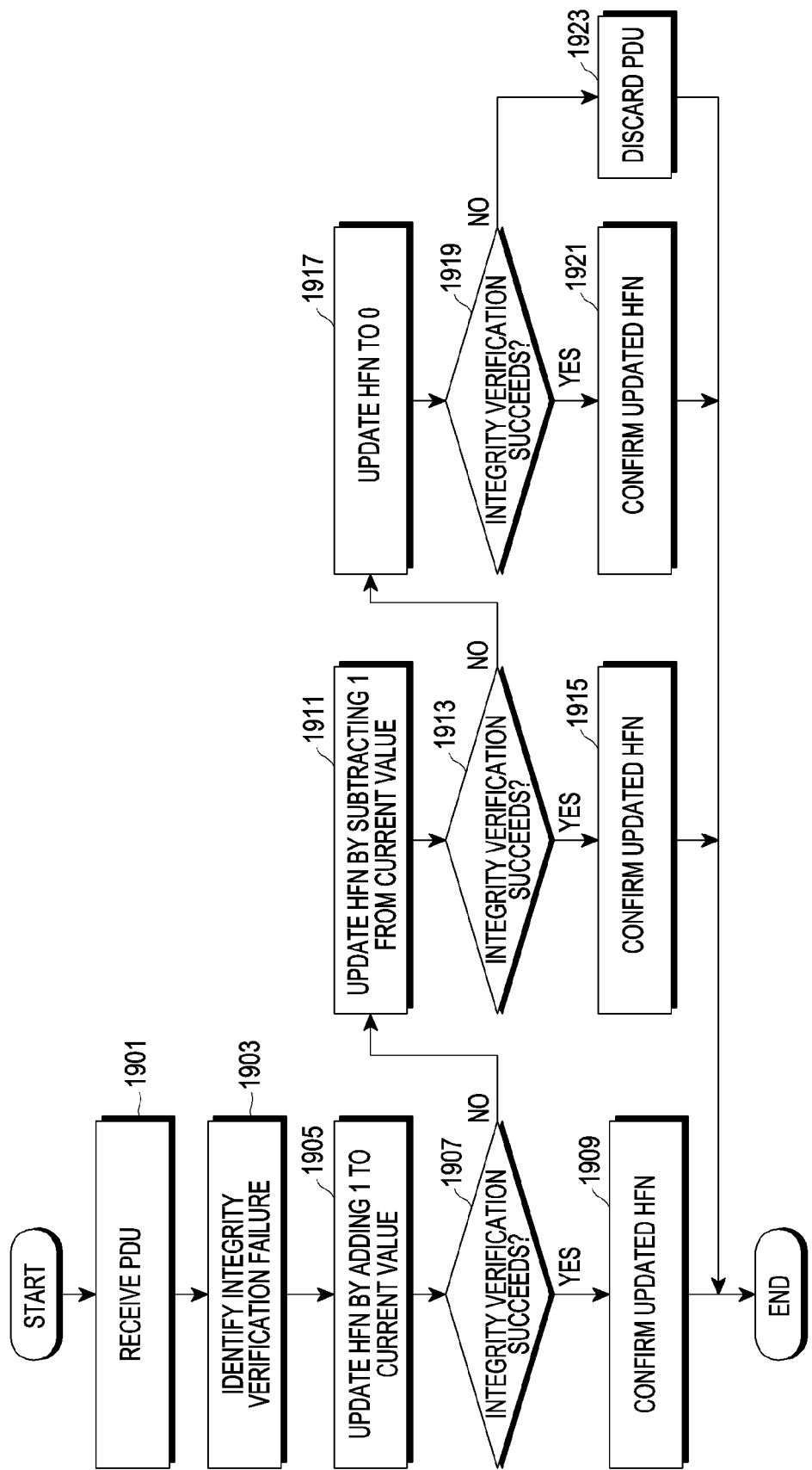
FIG. 19 is a flowchart illustrating an example method for operating an electronic device according to an embodiment.

FIG. 19 is a flowchart illustrating an example method for operating an electronic device according to an embodiment of the disclosure.

According to an embodiment, an electronic device 101 (e.g., at least one of the processor 120, the first communication processor 212, the second communication processor 214, the integrated communication processor 260, or the integrated SoC) may receive a PDU from a network 800 in operation 1901. For example, the electronic device 101 may receive a PDCP data PDU with a format as shown in FIG. 8B. The electronic device 101 may identify a failure in integrity verification in operation 1903. In operation 1905, the electronic device 101 may update the HFN by adding 1 to the current value. For example, when the current HFN managed (or retained) by the electronic device 101 is "D," the electronic device 101 may update the HFN to "D+1" in operation 1905. In operation 1907, the electronic device 101 may determine whether integrity verification succeeds. For example, the electronic device 101 may identify the count (COUNT) based on the HFN of "D+1" and may again perform deciphering and integrity verification based on the identified count.

Upon determining that integrity verification succeeds (yes in 1907), the electronic device 101 may confirm the updated HFN in operation 1909, according to an embodiment. The electronic device 101 may confirm, e.g., "D+1" as the HFN. Upon determining that integrity verification fails (no in 1907), the electronic device 101 may update the HFN by subtracting 1 from the current value in operation 1911. For example, the electronic device 101 may update the HFN to "D−1." In operation 1913, the electronic device 101 may determine whether integrity verification succeeds. For example, the electronic device 101 may identify the count (COUNT) based on the HFN of "D−1" and may again perform deciphering and integrity verification based on the identified count. Upon determining that integrity verification succeeds (yes in 1913), the electronic device 101 may confirm the updated HFN in operation 1915. The electronic device 101 may confirm, e.g., "D−1" as the HFN. Upon determining that integrity verification fails (no in 1913), the electronic device 101 may update the HFN to 0 in operation 1917. In operation 1919, the electronic device 101 may determine whether integrity verification succeeds. For example, the electronic device 101 may identify the count (COUNT) based on the HFN of "0" and may again perform deciphering and integrity verification based on the identified count. Upon determining that integrity verification succeeds (yes in 1919), the electronic device 101 may confirm the updated HFN in operation 1921. The electronic device 101 may confirm, e.g., "0" as the HFN. Upon determining that integrity verification fails (no in 1919), the electronic device 101 may confirm failure in integrity verification and discard the PDU in operation 1923.

According to an embodiment, setting to "+1," "−1," or "0" in operations 1905, 1911, and 1917 is merely an example, and the order is not limited thereto, and the values may be changed.

According to an example embodiment, an electronic device 101 comprises: at least one processor (e.g., at least one of the processor 120, the first communication processor 212, the second communication processor 214, the integrated communication processor 260, or an integrated SoC). The at least one processor (e.g., at least one of the processor 120, the first communication processor 212, the second communication processor 214, the integrated communication processor 260, or an integrated SoC) may be configured to: receive a first message indicating a packet data convergence protocol (PDCP) state of a network from the network, identify a first missing count (FMC) of the network based on the first message, identify a count of a message scheduled to be transmitted by the electronic device (e.g., electronic device 101), compare the count of the message scheduled to be transmitted with the FMC, and adjust the count of the message scheduled to be transmitted, based on a result of the comparison.

According to an example embodiment, the at least one processor (e.g., at least one of the processor 120, the first communication processor 212, the second communication processor 214, the integrated communication processor 260, or an integrated SoC) may be configured to, as part of adjusting the count of the message scheduled to be transmitted based on the result of the comparison, adjust the count of the message scheduled to be transmitted, based on identifying that the count of the message scheduled to be transmitted by the electronic device is less than the FMC.

According to an example embodiment, the at least one processor (e.g., at least one of the processor 120, the first communication processor 212, the second communication processor 214, the integrated communication processor 260, or an integrated SoC) may be configured to, as part of adjusting the count of the message scheduled to be transmitted based on the result of the comparison, adjust the count of the message scheduled to be transmitted to the FMC, based on identifying that the count of the message scheduled to be transmitted by the electronic device is less than the FMC.

According to an example embodiment, the at least one processor (e.g., at least one of the processor 120, the first communication processor 212, the second communication processor 214, the integrated communication processor 260, or an integrated SoC) may be configured to, as part of adjusting the count of the message scheduled to be transmitted based on the result of the comparison, adjust the count of the message scheduled to be transmitted, based on identifying that a result of subtracting a designated first value from the count of the message scheduled to be transmitted by the electronic device, is greater than the FMC.

According to an example embodiment, the first value may be set based on at least one of a maximum throughput, a maximum transmission unit (MTU) size, a reordering timer time, or a bandwidth or is a designated constant.

According to an example embodiment, the at least one processor (e.g., at least one of the processor 120, the first communication processor 212, the second communication processor 214, the integrated communication processor 260, or an integrated SoC) may be configured to, as part of adjusting the count of the message scheduled to be transmitted based on the result of the comparison, perform a radio link failure (RLF) procedure. The RLF procedure may include a random access procedure, an RRC reestablishment procedure, and an RRC reconfiguration procedure or an RRC connection and setup procedure including random access or a SERVICE REQUEST, and an RRC reconfiguration procedure. The count of the message scheduled to be transmitted may be adjusted by the RLF procedure.

According to an example embodiment, the at least one processor (e.g., at least one of the processor 120, the first communication processor 212, the second communication processor 214, the integrated communication processor 260, or an integrated SoC) may be configured to, as part of adjusting the count of the message scheduled to be transmitted based on the result of the comparison, transmit a message requesting recovery to the network.

According to an example embodiment, the message for requesting recovery may include a packet data convergence protocol (PDCP) control protocol data unit (PDU). A PDU type field of the PDCP control PDU may include a value for identifying a type of the message for requesting recovery.

According to an embodiment, the at least one processor (e.g., at least one of the processor 120, the first communication processor 212, the second communication processor 214, the integrated communication processor 260, or an integrated SoC) may be configured to, as part of adjusting the count of the message scheduled to be transmitted based on the result of the comparison, adjust the count of the message scheduled to be transmitted using RRC reconfiguration of PDCP reestablishment or an RRC reconfiguration procedure of full config (e.g., full configuration) and data radio bearer (DRB) setup.

According to an example embodiment, an electronic device comprises at least one processor (e.g., at least one of the processor 120, the first communication processor 212, the second communication processor 214, the integrated communication processor 260, or an integrated SoC). The at least one processor (e.g., at least one of the processor 120, the first communication processor 212, the second communication processor 214, the integrated communication processor 260, or an integrated SoC) may be configured to receive a first message from a network, compare a count of the first message with at least one count set in the electronic device, and adjust the at least one count set in the electronic device based on a result of the comparison.

According to an example embodiment, the at least one processor (e.g., at least one of the processor 120, the first communication processor 212, the second communication processor 214, the integrated communication processor 260, or an integrated SoC) may be configured to, as part of adjusting the at least one count set in the electronic device 101 based on the result of the comparison, adjust the at least one count set in the electronic device based on identifying that the count of the first message is less than a result of subtracting a second value from a count of a first PDCP SDU not transferred from the electronic device 101 to an upper layer but waiting.

According to an example embodiment, the second value may be set based on at least one of a maximum throughput, a maximum transmission unit (MTU) size, a reordering timer time, or a bandwidth or is a designated constant.

According to an example embodiment, the at least one processor (e.g., at least one of the processor 120, the first communication processor 212, the second communication processor 214, the integrated communication processor 260, or an integrated SoC) may be configured to, as part of adjusting the at least one count set in the electronic device based on the result of the comparison, adjust the at least one count set in the electronic device based on identifying that the count of the first message is greater than a sum of a count of a next PDCP SDU expected to be received by the electronic device and a third value.

According to an example embodiment, the third value may be set based on at least one of a maximum throughput, a maximum transmission unit (MTU) size, a reordering timer time, or a bandwidth or is a designated constant.

According to an embodiment, the at least one processor (e.g., at least one of the processor 120, the first communication processor 212, the second communication processor 214, the integrated communication processor 260, or an integrated SoC) may be configured to further receive a second message. The at least one processor (e.g., at least one of the processor 120, the first communication processor 212, the second communication processor 214, the integrated communication processor 260, or an integrated SoC) may be configured to, as part of adjusting the at least one count set in the electronic device based on the result of the comparison, identify a first difference between a count of the second message and a count of a next PDCP SDU retained and expected to be received by the electronic device before the first message is received, and identify a second difference between the count of the first message and the count of the second message.

According to an example embodiment, the electronic device may further comprise the at least one processor (e.g., at least one of the processor 120, the first communication processor 212, the second communication processor 214, the integrated communication processor 260, or an integrated SoC) which may be configured to, as part of adjusting the at least one count set in the electronic device based on the result of the comparison, based on the first difference being equal to or greater than the second difference, adjust the count of the next PDCP SDU retained and expected to be received by the electronic device based on at least one of the count of the first message and the count of the second message.

According to an example embodiment, the electronic device may further comprise the at least one processor (e.g., at least one of the processor 120, the first communication processor 212, the second communication processor 214, the integrated communication processor 260, or an integrated SoC) which may be configured to, as part of adjusting the at least one count set in the electronic device based on the result of the comparison, based on the first difference being less than the second difference, adjust the count of the next PDCP SDU retained and expected to be received by the electronic device 101 based on at least one of a count of a next PDCP SDU retained and expected to be received by the electronic device 101 before the first message is received or the count of the second message.

According to an example embodiment, the at least one processor (e.g., at least one of the processor 120, the first communication processor 212, the second communication processor 214, the integrated communication processor 260, or an integrated SoC) may be configured to, as part of adjusting the at least one count set in the electronic device 101 based on the result of the comparison, perform an RLF procedure. The RLF procedure includes a random access procedure, an RRC reestablishment procedure, and an RRC reconfiguration procedure or an RRC connection and setup procedure including random access or a SERVICE REQUEST, and an RRC reconfiguration procedure. The at least one count is adjusted by the RLF procedure.

According to an example embodiment, the at least one processor (e.g., at least one of the processor 120, the first communication processor 212, the second communication processor 214, the integrated communication processor 260, or an integrated SoC) may be configured to, as part of adjusting the at least one count set in the electronic device based on the result of the comparison, transmit a message requesting recovery to the network and adjust the count of the message scheduled to be transmitted, using RRC reconfiguration of PDCP reestablishment or an RRC reconfiguration procedure of full config and DRB setup.

According to an example embodiment, an electronic device comprises: at least one processor (e.g., at least one of the processor 120, the first communication processor 212, the second communication processor 214, the integrated communication processor 260, or an integrated SoC). The at least one processor (e.g., at least one of the processor 120, the first communication processor 212, the second communication processor 214, the integrated communication processor 260, or an integrated SoC) may be configured to receive a first packet data convergence protocol (PDCP) control protocol data unit (PDU) for a PDCP status report indicating a PDCP status of a network from the network, identify a first missing count (FMC) included in the PDCP control PDU, identify a count of a message scheduled to be transmitted by the electronic device, and transmit a second PDCP control PDU including PDU type information indicating a PDCP recovery request based on the count of the message scheduled to be transmitted and the FMC meeting a designated condition.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various example embodiments, there may be provided an electronic device and method of operating the same may identify a mismatch between the respective counts of a transmission entity and a reception entity and perform operations to address the mismatch. Therefore, the occasion of discarding packets due to a mismatch in count may be reduced.

While the disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   at least one processor, wherein
   the at least one processor is configured to:
   receive a first message indicating a packet data convergence protocol (PDCP) state of a network from the network,
   identify a first missing count (FMC) of the network based on the first message,
   identify a count of a message scheduled to be transmitted by the electronic device,
   compare the count of the message scheduled to be transmitted with the FMC, and
   adjust the count of the message scheduled to be transmitted based on a result of the comparison by at least identifying that a result of subtracting a designated first value from the count of the message scheduled to be transmitted by the electronic device is greater than the FMC.

2. The electronic device of claim 1, wherein:
   the at least one processor is configured to, as part of adjusting the count of the message scheduled to be transmitted based on the result of the comparison,
   adjust the count of the message scheduled to be transmitted based on identifying that the count of the message scheduled to be transmitted by the electronic device is less than the FMC.

3. The electronic device of claim 2, wherein:
   the at least one processor is configured to, as part of adjusting the count of the message scheduled to be transmitted based on the result of the comparison,
   adjust the count of the message scheduled to be transmitted to the FMC based on identifying that the count of the message scheduled to be transmitted by the electronic device is less than the FMC.

4. The electronic device of claim 1, wherein the first value is based on at least one of a maximum throughput, a maximum transmission unit (MTU) size, a reordering timer time, or a bandwidth or is a designated constant.

5. The electronic device of claim 1, wherein the at least one processor is configured to, as part of adjusting the count of the message scheduled to be transmitted based on the result of the comparison, transmit a message requesting recovery to the network.

6. The electronic device of claim 5, wherein the message for requesting recovery includes a packet data convergence protocol (PDCP) control protocol data unit (PDU), and wherein a PDU type field of the PDCP control PDU includes a value identifying a type of the message for requesting recovery.

7. The electronic device of claim 5, wherein the at least one processor is configured to, as part of adjusting the count of the message scheduled to be transmitted based on the result of the comparison, adjust the count of the message scheduled to be transmitted using Radio Resource Control (RRC) reconfiguration of PDCP reestablishment or an RRC reconfiguration procedure of full configuration and data radio bearer (DRB) setup.

8. An electronic device, comprising:
   at least one processor, wherein
   the at least one processor is configured to:
   receive a first message indicating a packet data convergence protocol (PDCP) state of a network from the network,
   identify a first missing count (FMC) of the network based on the first message,
   identify a count of a message scheduled to be transmitted by the electronic device,
   compare the count of the message scheduled to be transmitted with the FMC, and
   adjust the count of the message scheduled to be transmitted based on a result of the comparison, at least by performing a radio link failure (RLF) procedure,
   wherein the RLF procedure includes a random access procedure, a Radio Resource Control (RRC) reestablishment procedure, and an RRC reconfiguration procedure or an RRC connection and setup procedure including random access or a service request, and an RRC reconfiguration procedure.

9. An electronic device, comprising:
   at least one processor, wherein
   the at least one processor is configured to:
   receive a first message from a network,
   compare a count of the first message with at least one count set in the electronic device, and
   adjust the at least one count set in the electronic device based on a result of the comparison at least by identifying that the count of the first message is less than a result of subtracting a second value from a count of a first packet data convergence protocol (PDCP) Service Data Unit (SDU) or by identifying that the count of the first message is greater than a sum of a count of a next packet data convergence protocol (PDCP) service data unit (SDU) expected to be received by the electronic device and a third value.

10. The electronic device of claim 9, wherein the second value is based on at least one of a maximum throughput, a maximum transmission unit (MTU) size, a reordering timer time, or a bandwidth or is a designated constant.

11. The electronic device of claim 9, wherein the third value is based on at least one of a maximum throughput, a maximum transmission unit (MTU) size, a reordering timer time, or a bandwidth or is a designated constant.

12. The electronic device of claim 9, wherein the at least one processor is configured to, as part of adjusting the at least one count set in the electronic device based on the result of the comparison, perform a radio link failure (RLF) procedure, wherein
   the RLF procedure includes a random access procedure, a radio resource control (RRC) reestablishment procedure, and an RRC reconfiguration procedure or an RRC connection and setup procedure including random access or a service request, and an RRC reconfiguration procedure, and wherein
   the at least one count is adjusted by the RLF procedure.

13. The electronic device of claim 9, wherein:
   the at least one processor is configured to, as part of adjusting the at least one count set in the electronic device based on the result of the comparison,
   transmit a message requesting recovery to the network and adjust the count of the message scheduled to be transmitted, using radio resource control (RRC) reconfiguration of packet data convergence protocol (PDCP) reestablishment or an RRC reconfiguration procedure of full configuration and data resource bearer (DRB) setup.

14. An electronic device, comprising:
at least one processor, wherein the at least one processor is configured to:
receive a first message from a network,
compare a count of the first message with at least one count set in the electronic device,
adjust the at least one count set in the electronic device based on a result of the comparison,
identify a first difference between a count of the second message and a count of a next packet data convergence protocol (PDCP) service data unit (SDU) retained and expected to be received by the electronic device before the first message is received, and
identify a second difference between the count of the first message and the count of the second message.

15. The electronic device of claim 14, wherein:
the at least one processor is configured to, as part of adjusting the at least one count set in the electronic device based on the result of the comparison,
based on the first difference being equal to or greater than the second difference, adjust the count of the next PDCP SDU retained and expected to be received by the electronic device based on at least one of the count of the first message and the count of the second message.

16. The electronic device of claim 14, wherein:
the at least one processor is configured to, as part of adjusting the at least one count set in the electronic device based on the result of the comparison,
based on the first difference being less than the second difference, adjust the count of the next PDCP SDU retained and expected to be received by the electronic device based on at least one of a count of a next PDCP SDU retained and expected to be received by the electronic device before the first message is received or the count of the second message.

17. An electronic device, comprising:
at least one processor, wherein:
the at least one processor is configured to:
receive a first packet data convergence protocol (PDCP) control protocol data unit (PDU) for a PDCP status report indicating a PDCP status of a network from the network,
identify a first missing count (FMC) included in the PDCP control PDU,
identify a count of a message scheduled to be transmitted by the electronic device, and
transmit a second PDCP control PDU including PDU type information indicating a PDCP recovery request based on the count of the message scheduled to be transmitted and the FMC meeting a designated condition, wherein the designated condition includes that a result of subtracting a designated value from the count of the message scheduled to be transmitted by the electronic device is greater than the FMC.

* * * * *